United States Patent [19]

Takahashi et al.

[11] 3,740,536

[45] June 19, 1973

[54] ELECTRONIC DIGITAL WEIGHING APPARATUS

[75] Inventors: Yasuyoshi Takahashi, Mishima; Nobuhiko Oshiro, Shizuoka-ken; Tsutomu Msysui, Mishima; Yoshiaki Tomokubo, Numazu; Norihisa Osaka, Fuji, all of Japan

[73] Assignee: Tokyo Electric Co., Ltd., Tokyo, Japan

[22] Filed: Aug. 25, 1971

[21] Appl. No.: 174,898

[52] U.S. Cl. ......... 235/151.33, 235/92 WT, 177/25
[51] Int. Cl. ...... G06g 7/48, G06f 15/20, G06f 7/39
[58] Field of Search ................. 235/151.33, 92 WT; 177/25

[56] References Cited
UNITED STATES PATENTS

| | | | |
|---|---|---|---|
| 3,612,842 | 10/1971 | Aga et al. | 235/151.33 |
| 3,393,302 | 7/1968 | Cichanowicz et al. | 235/151.33 |
| 3,205,956 | 9/1965 | Bell et al. | 235/151.33 X |
| 3,587,759 | 6/1971 | Susor | 235/151.33 X |
| 3,657,526 | 4/1972 | Konisi et al. | 235/151.33 |
| 3,557,353 | 1/1971 | Allen et al. | 235/151.33 |

Primary Examiner—Malcolm A. Morrison
Assistant Examiner—James F. Gottman
Attorney—Kemon, Palmer & Estabrook

[57] ABSTRACT

An electronic digital weighing apparatus comprising a weight detecting section for detecting the weight of an object as an analog quantity and an analog-digital converter for converting the analog quantity to a digital quantity. The digital quantity is counted by an UP-DOWN counter the contents of which are drawn out in serial form. A unit price per unit weight of an object weighed is read into a unit price register. The serial output representing the contents of the UP-DOWN counter and the contents of a price register are added by the same number of times as the numerals stored in the unit price register. The results of the addition are introduced into the price register, and the serial output representing the contents of the UP-DOWN counter, and the contents of the unit price register and price register are indicated in digits.

15 Claims, 27 Drawing Figures

Patented June 19, 1973
3,740,536
18 Sheets-Sheet 2
F I G. 1A
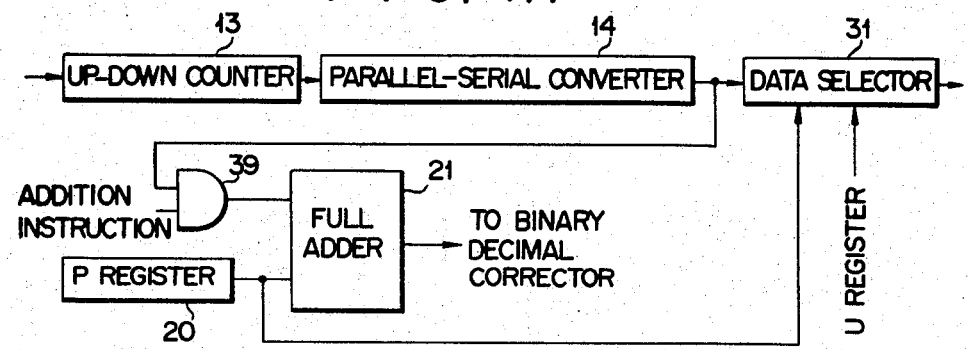
F I G. 3A
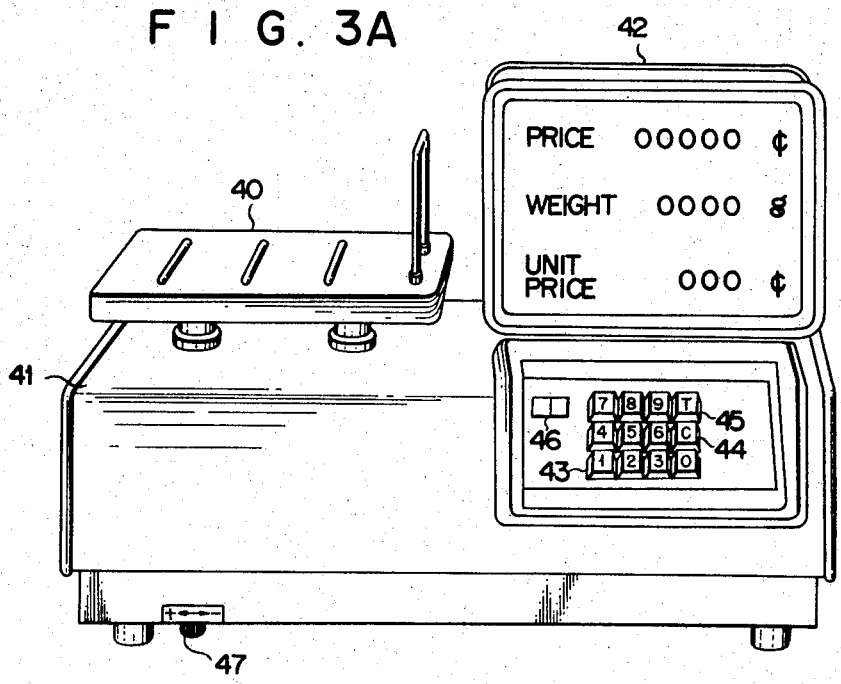

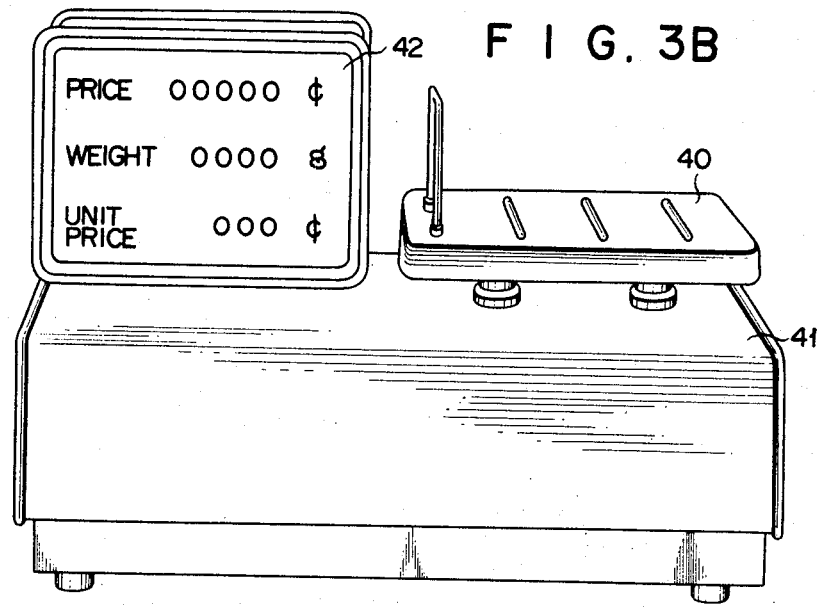
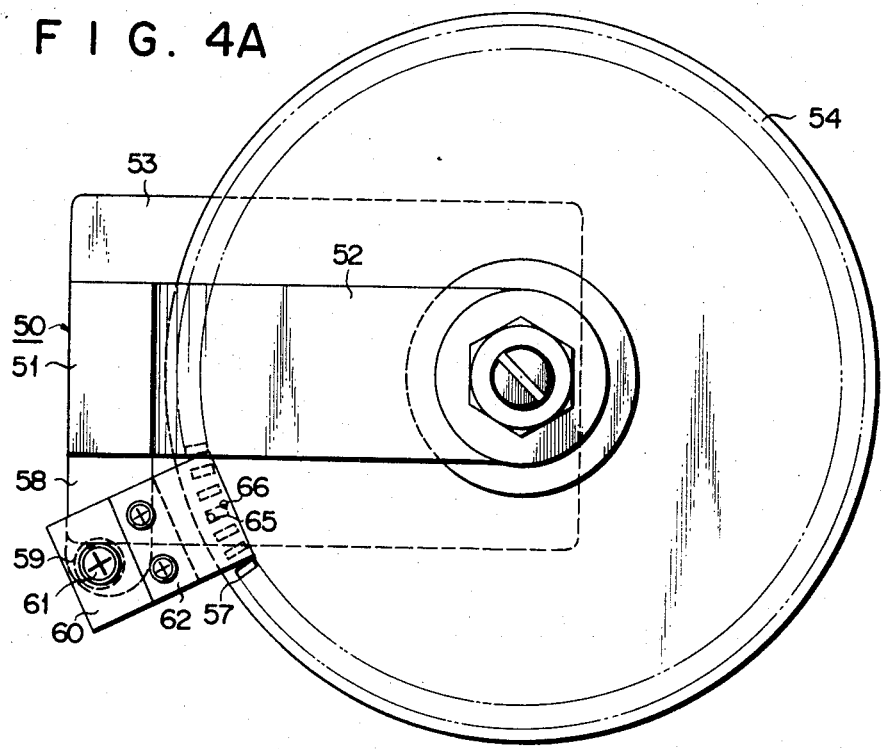

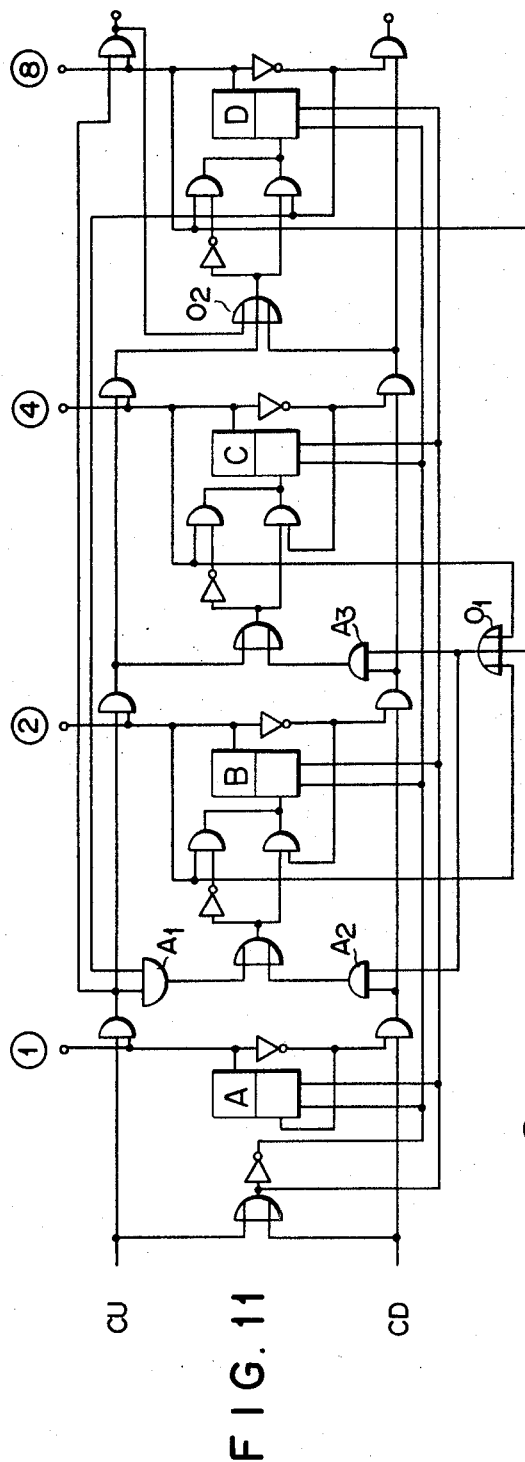
F I G. 11
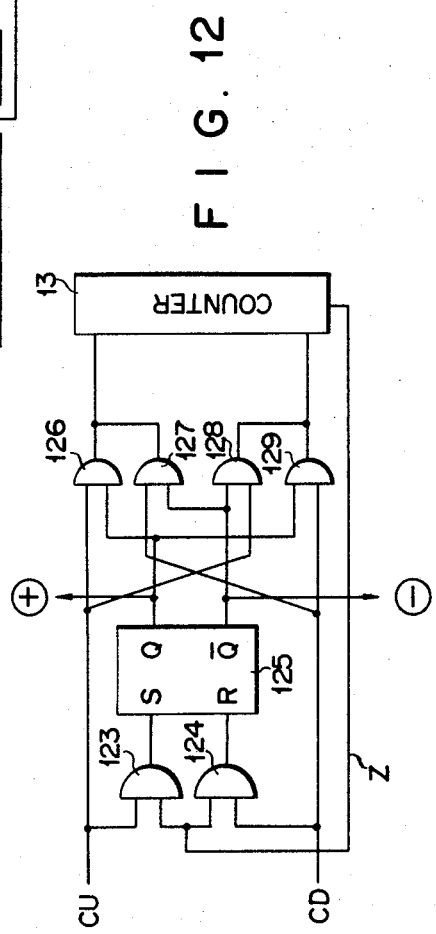
F I G. 12

TO W REGISTER INPUT GATE

F I G. 16
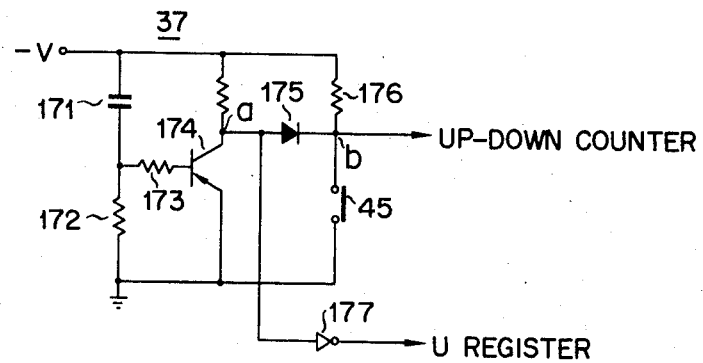
F I G. 17
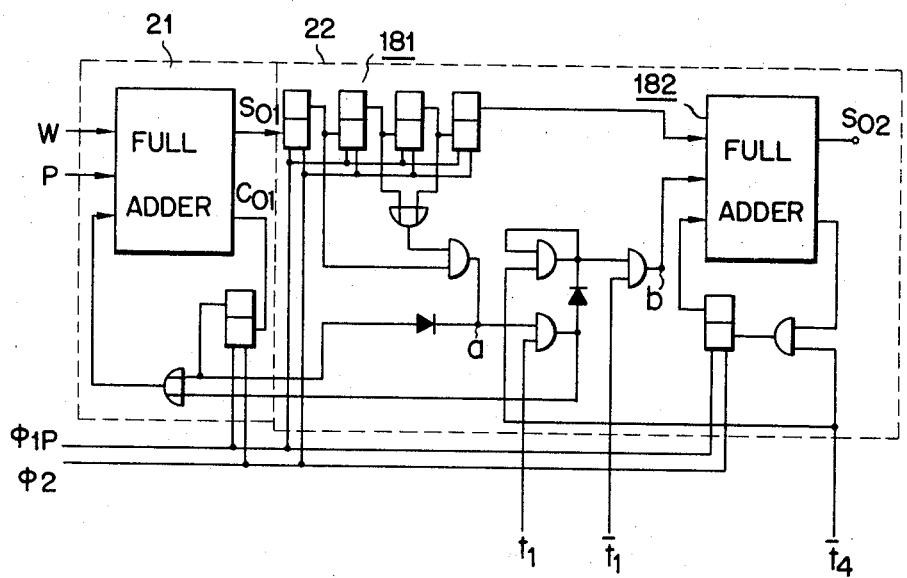

Patented June 19, 1973 3,740,536
18 Sheets-Sheet 18
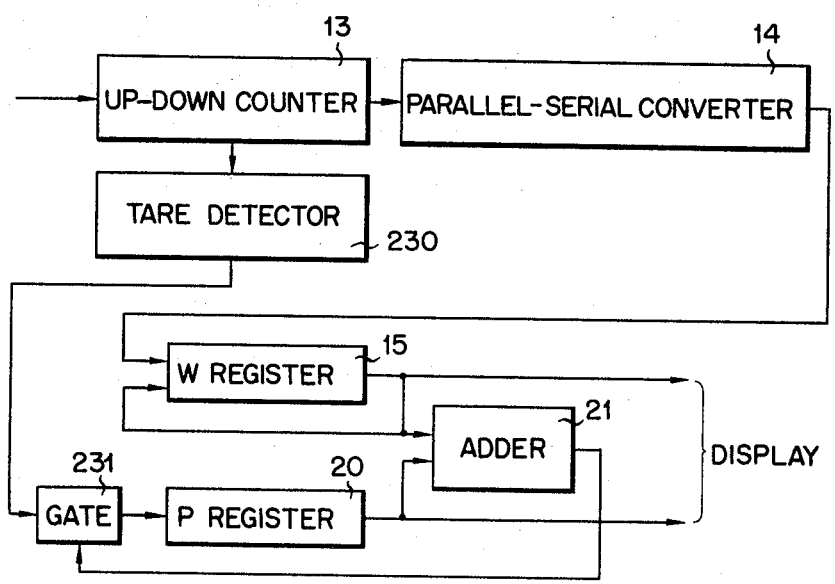
F I G. 20
F I G. 21

ELECTRONIC DIGITAL WEIGHING APPARATUS

This invention relates to an electronic digital weighing apparatus capable of indicating the weight of an object and a price arrived at by multiplying the weight by a unit price per unit weight of the object.

Where a weighing apparatus indicating the price of a weighed object by multiplying its total weight by a unit price per unit weight thereof uses a counter type multiplication circuit, the circuit arrangement becomes complicated. The counter type multiplcation circuit is so designed that a multiplicand is repeatedly added up by the same number of times as the numeral of a multiplier, and when multiplication is fully conducted up to the number of times equal to the numeral of the multiplier, then operation is stopped. Accordingly, the counter type multiplication circuit requires a device for generating a command to stop multiplication when there is reached the number of times the multiplication should be performed. Where there have to be handled numbers having many places, multiplication is repeated many times, with the resultant retardation of operation.

It is accordingly the object of this inventon to provide a weighing apparatus capable of prominently accelerating the speed at which the weight of an object is multiplied by a unit price per unit weight thereof by means of a simplified circuit arrangement.

According to an aspect of this invention, there is provided an electronic digital weighing apparatus comprising means for detecting the weight of an object in the form of an analog quantity; means for converting the analog quantity to a digital quantity; and UP-DOWN counter for counting said digital quantity; a parallel-serial converter for converting the content of said counter in serial form; means for setting the unit price of the object; a unit price register for storing data from said unit price setting means; a price register; means for adding together output of said parallel-serial converter and the content of said price register and having the results of addition stored in said price register; means for digitally indicating output of the parallel-serial converter and the contents of said price register and unit price register; and means for performing addition a number of times equal to the content of said unit price register including a first counter for counting the number of additions; a zero detector and coincidence circuit for generating a control signal where the least significant digit of said unit price register is zero or where it coincides with the content of said first counter; means for generating a shift signal so as to cause in response to said control signal the contents of said price register and unit price register to be shifted by one place; and a second counter responsive to the shift signal to be counted up to generate a signal to stop addition when the content thereof attains a predetermined value; said first counter being reset by the shift signal and said second counter being reset by a signal obtained according to the digital quantity.

This invention can be more fully understood from the following detailed description when taken in conjunction with reference to the accompanying drawings, in which:

FIG. 1A is a partial modification of FIG. 1;

FIGS. 3A and 3B are external views of the weighing apparatus of the invention;

Figure 1:
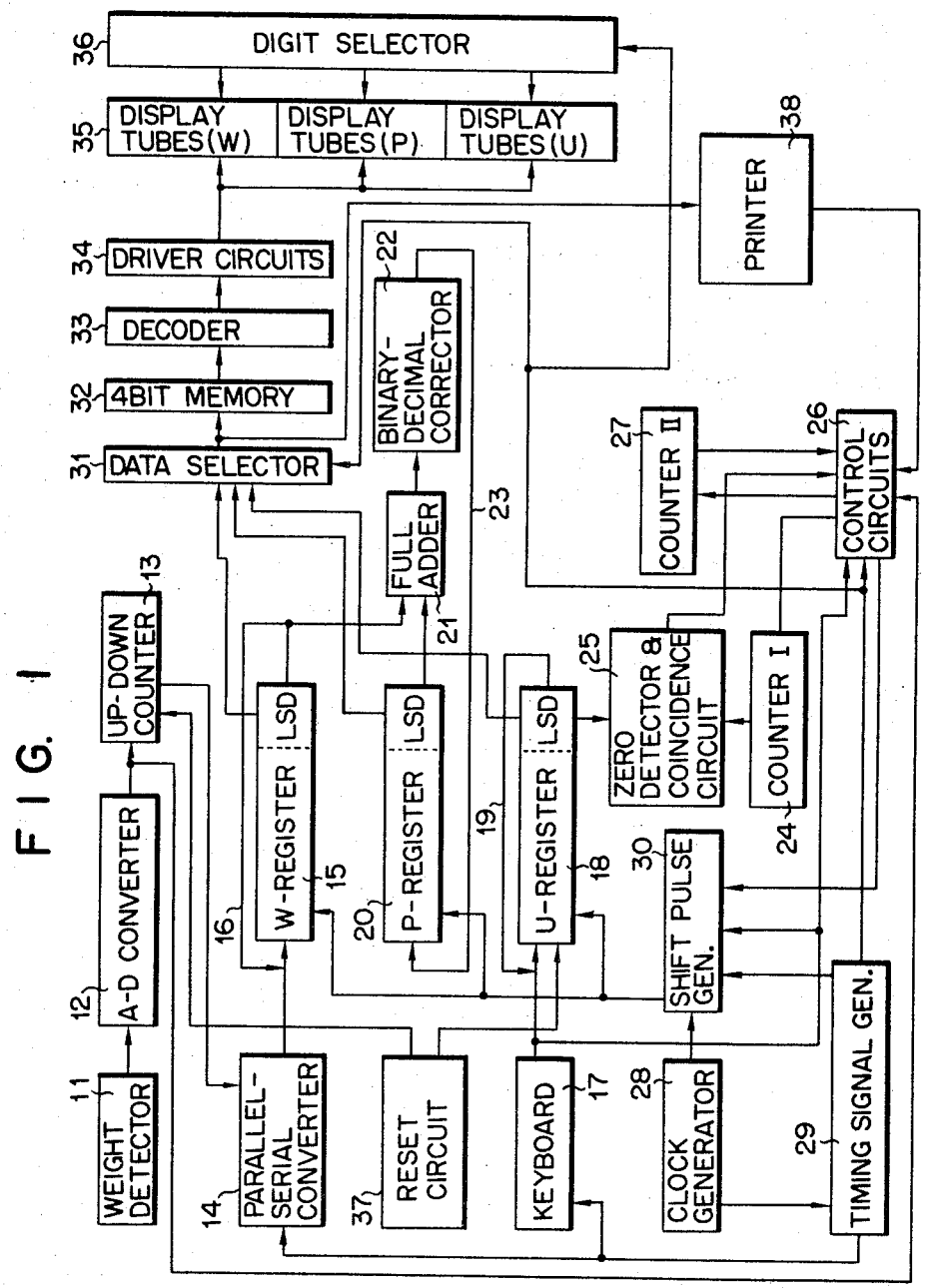
FIG. 1 is a block diagram of an electronic digital weighing apparatus according to this invention.
Figure 5:
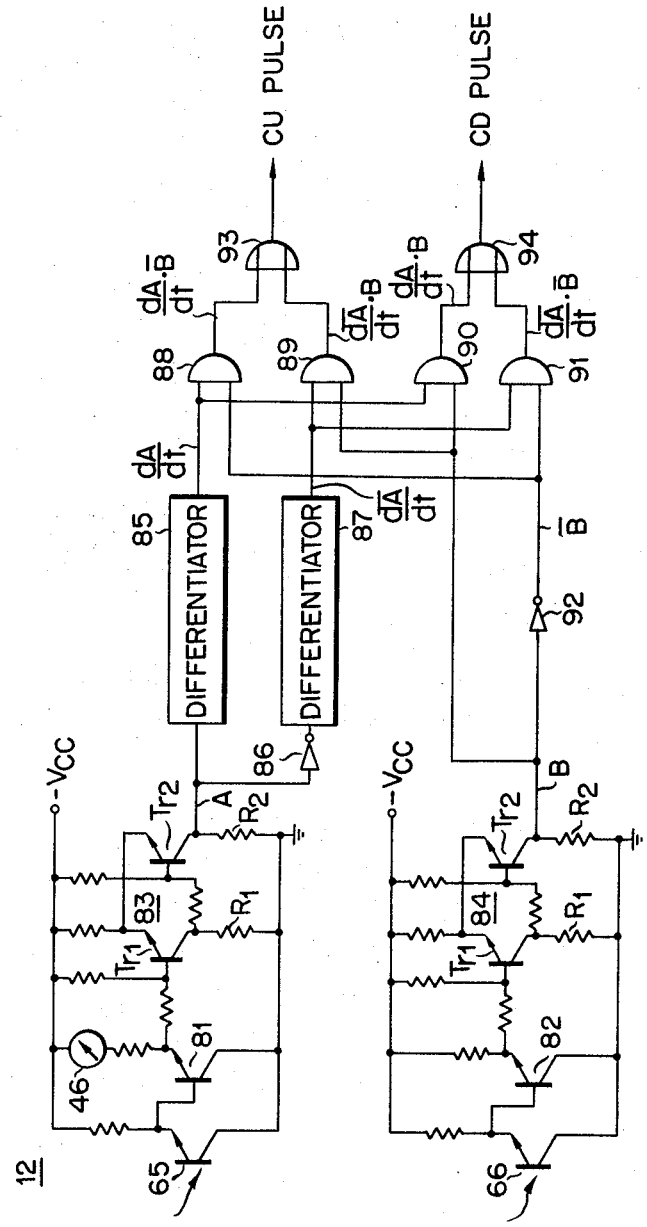
Figure 6:
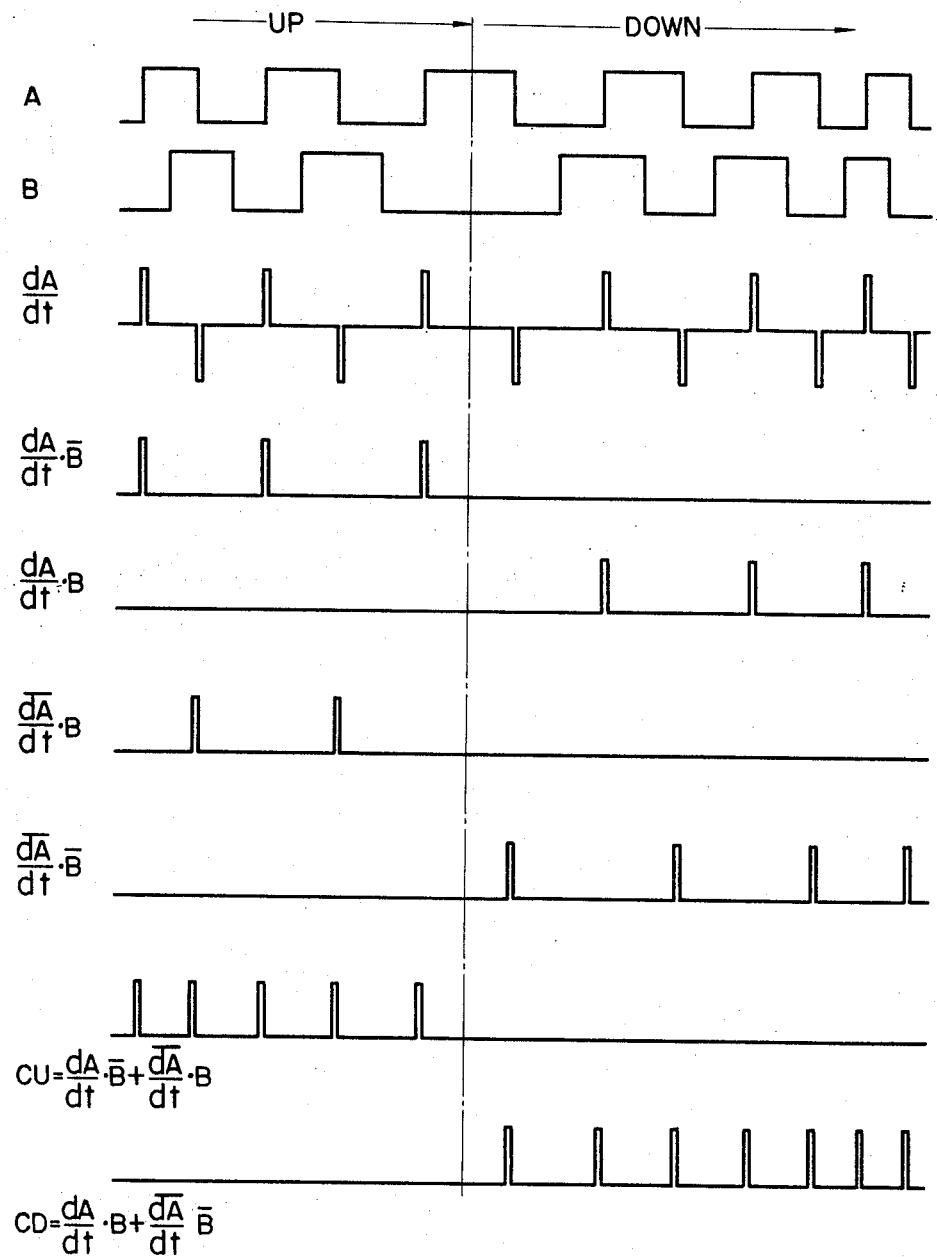
Figure 7:
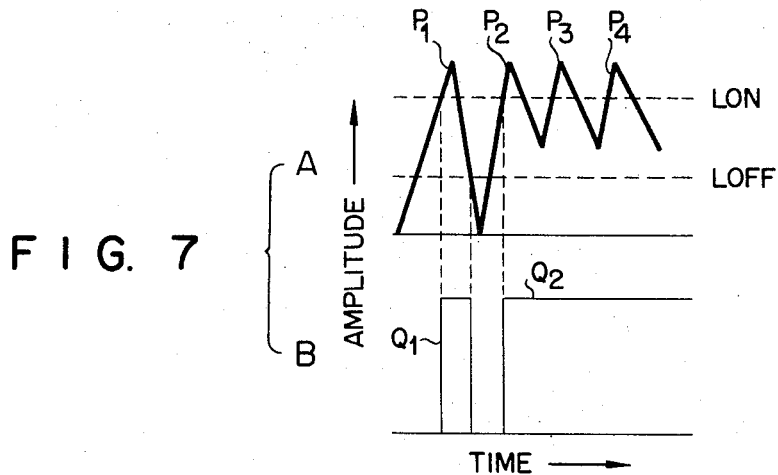
Figure 10:
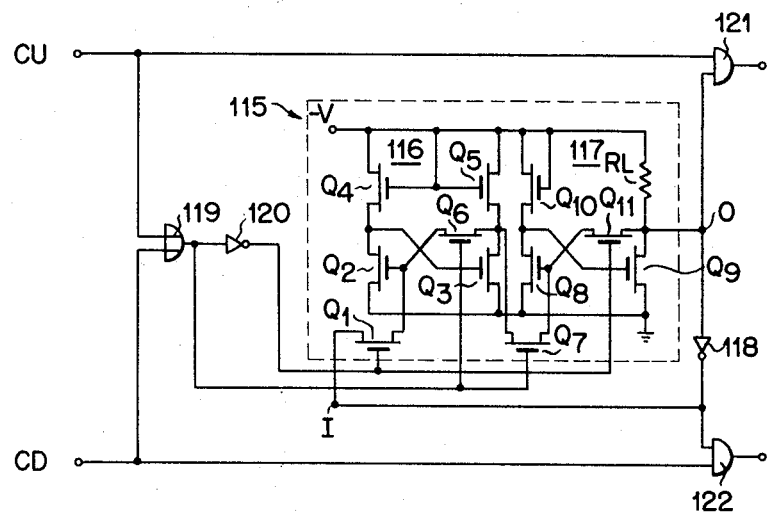
Figure 8:
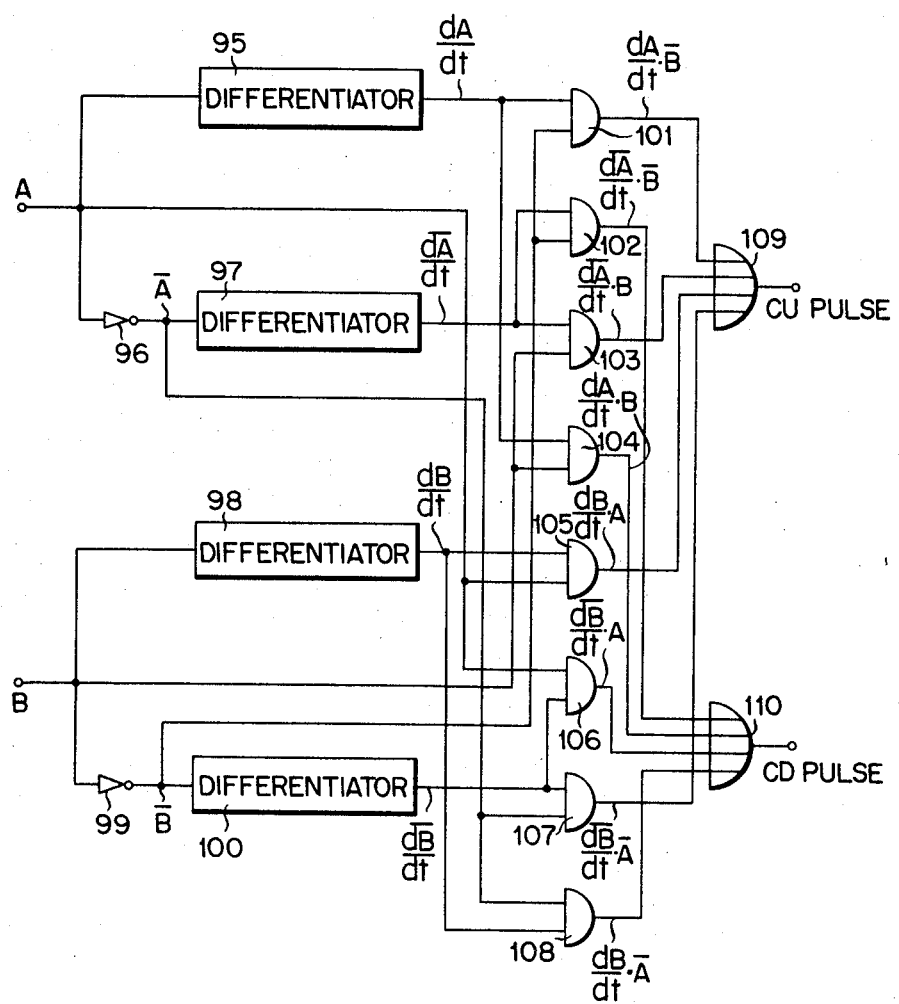
Figure 9:
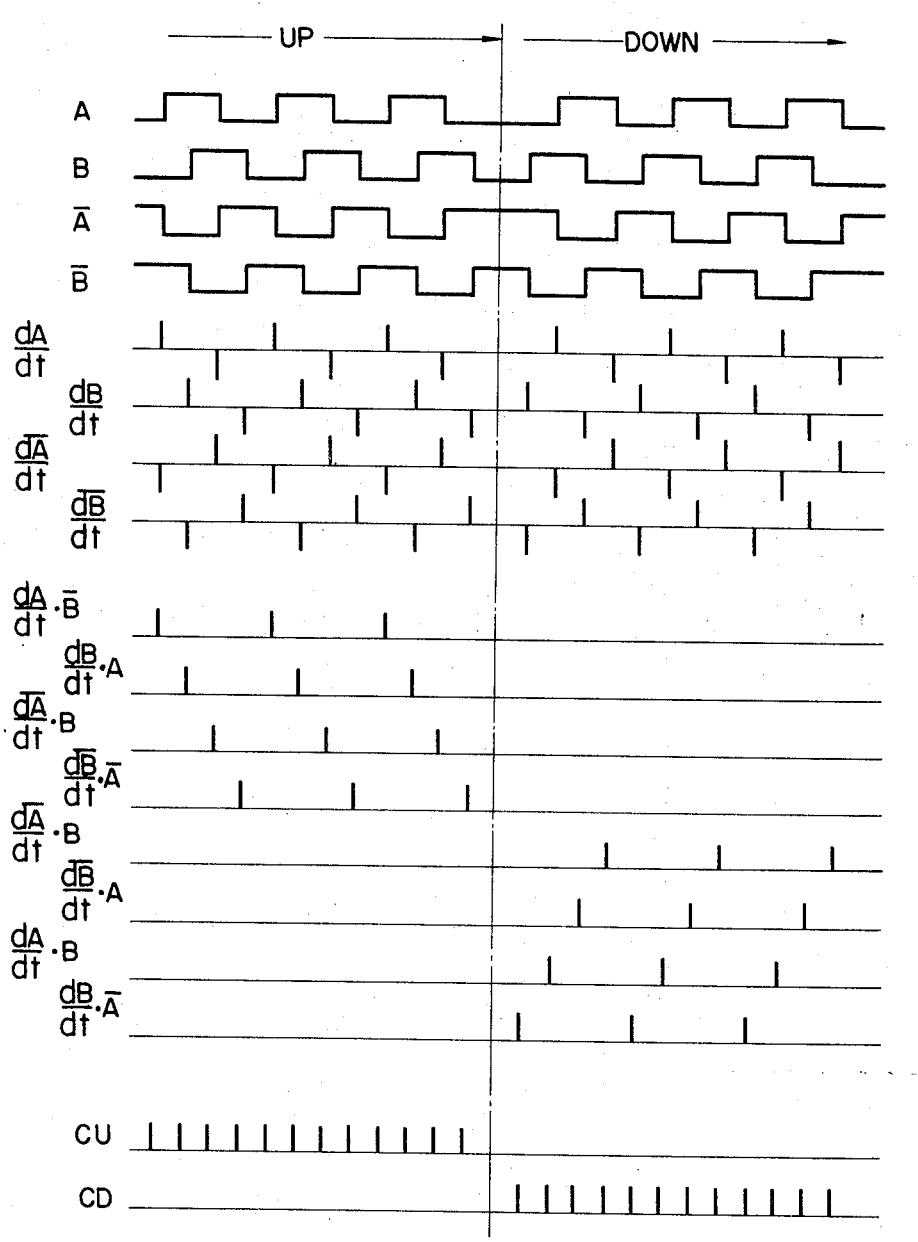
Figure 13:
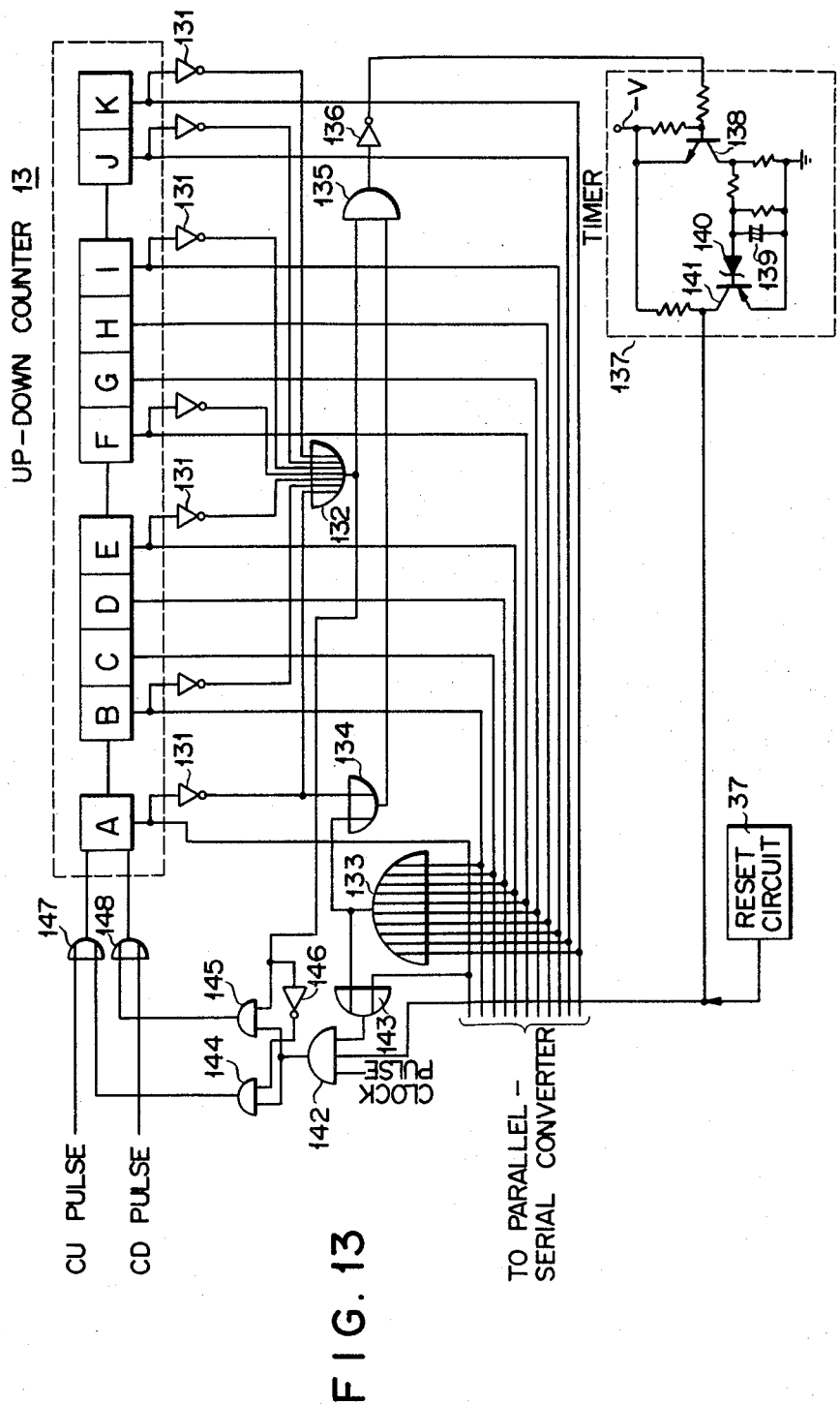
Figure 14:
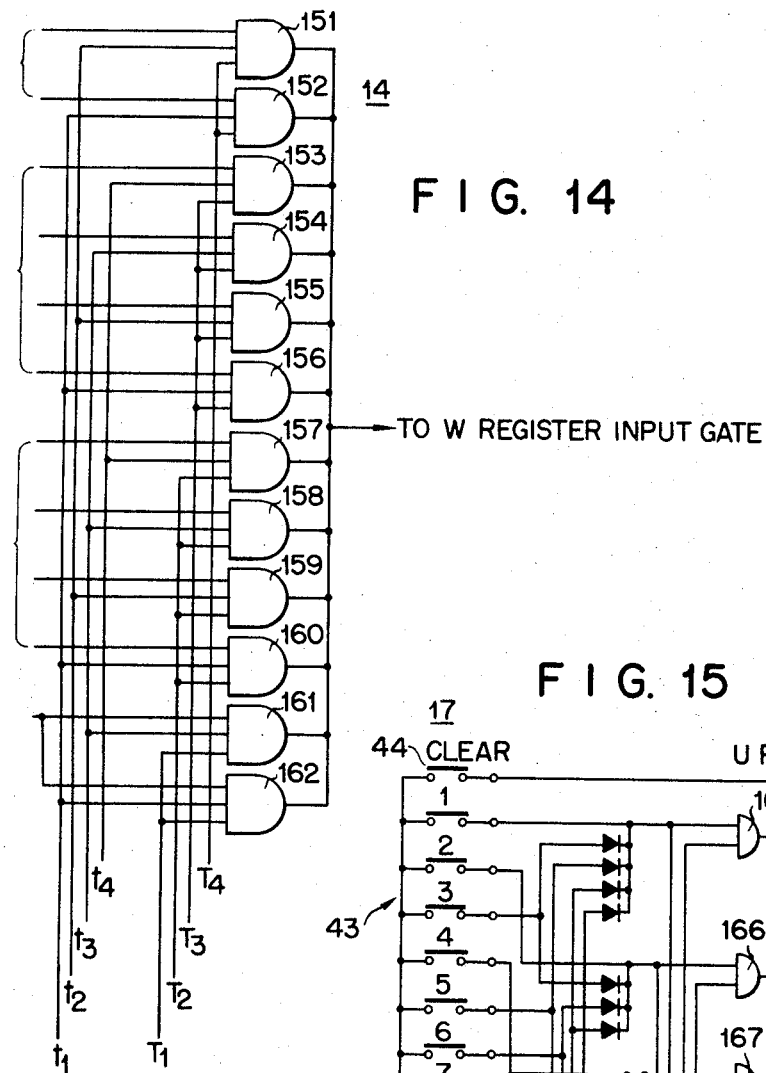
Figure 15:
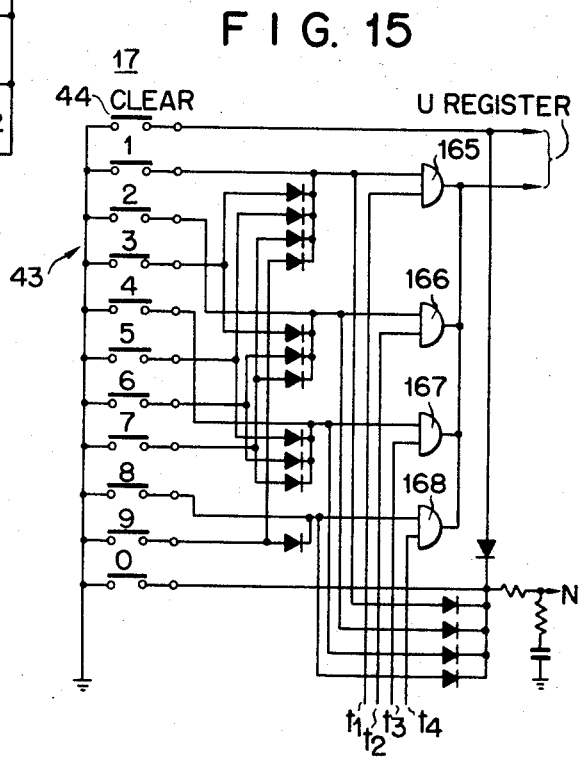
Figure 18:
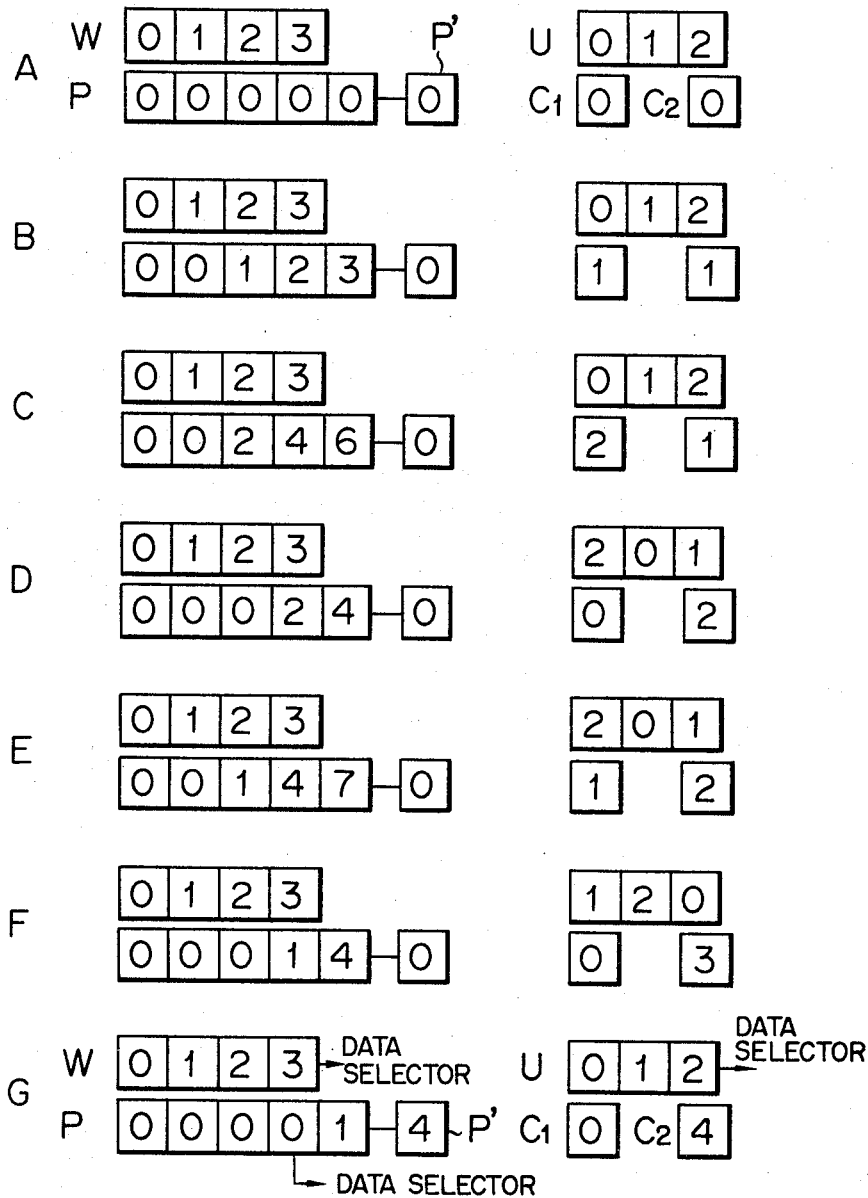
Figure 19:
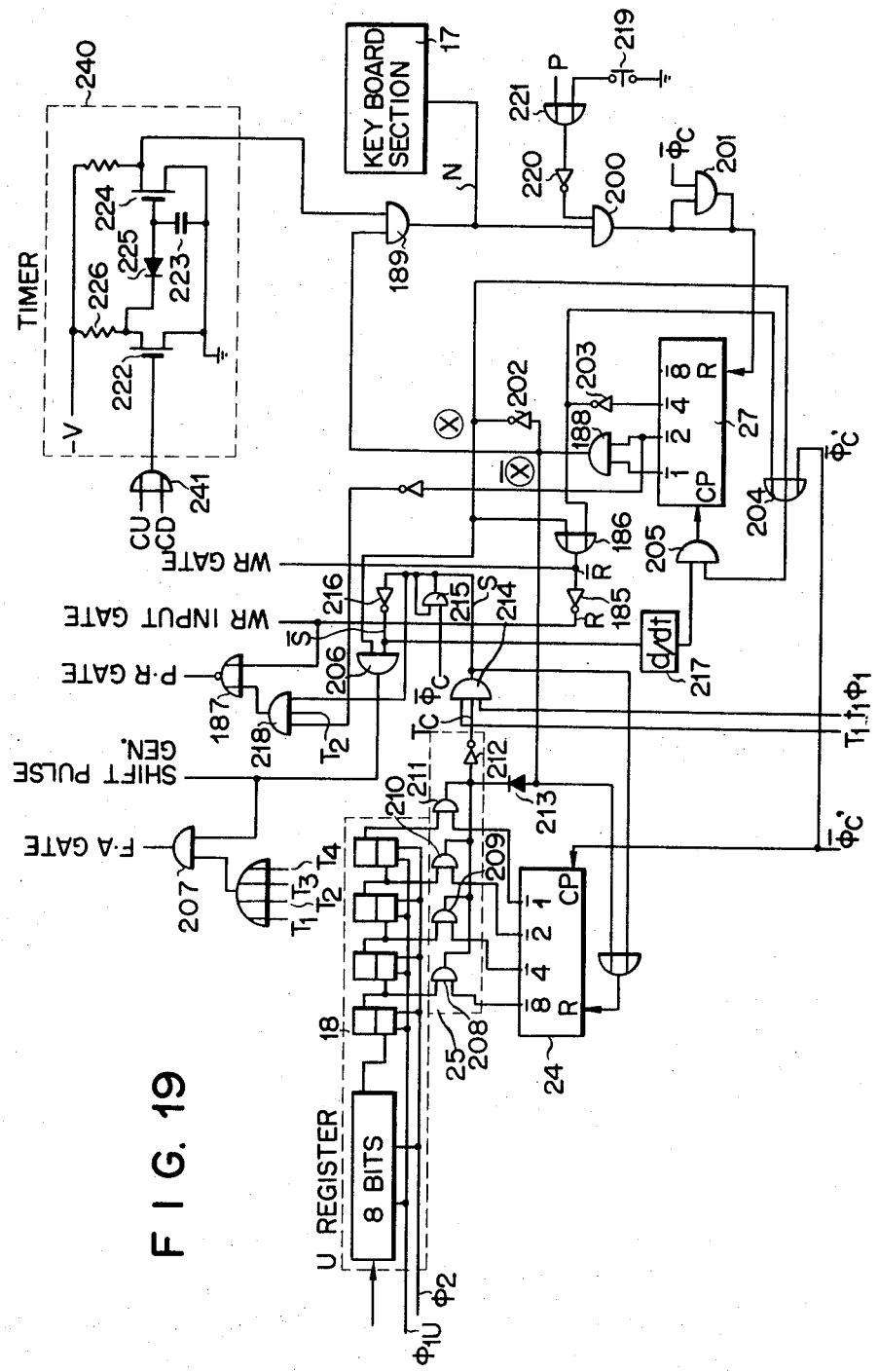

FIGS. 4A to 4E indicate the arrangement of the weight detector of FIG. 1;

FIG. 5 shows the circuit arrangement of the analog-digital converter of FIG. 1;

FIG. 6 indicates the wave forms of signals by way of illustrating the operation of the converter of FIG. 5;

FIG. 7 schematically illustrates the operation of a Schmitt circuit;

FIG. 8 is a partial modification of the circuit arrangement of FIG. 5;

FIG. 9 shows the wave forms of signals by way of illustrating the operation of the modified circuit arrangement of FIG. 8;

FIG. 10 represents the circuit arrangement of part of the UP-DOWN counter of FIG. 1;

FIG. 11 shows the circuit arrangement of the other part of the UP-DOWN counter of FIG. 1;

FIG. 12 indicates a circuit for causing the UP-DOWN counter to count absolute values;

FIG. 13 illustrates a circuit for causing the UP-DOWN counter to be reset when its contents represent the weight of a tare attached to an object;

FIG. 14 is a circuit diagram of the parallel-serial converter of FIG. 1;

FIG. 15 is a circuit diagram of the keyboard section of FIG. 1;

FIG. 16 is a circuit diagram of the reset circuit of FIG. 1;

FIG. 17 is a circuit diagram of the binary-decimal corrector;

FIG. 18 is a chart illustrating the method of multiplication conducted by the weighing apparatus of this invention;

FIG. 19 is a diagram of the control circuits of FIG. 1;

FIG. 20 shows the condition of outputs from the counters of FIG. 19; and

FIG. 21 is a modification of the circuit of FIG. 13.

FIG. 1 is a block diagram of an electronic digital weighing apparatus according to this invention. Reference numeral 11 is a weight detector for detecting the weight of an object. As later detailed, the weight detector 11 has a rotary disk perforated with a plurality of slits at an equal space around the periphery and detects the weight of an object by rotating the disk by an angle corresponding to the weight of the object and by detecting or counting the number of slits falling within the angle of rotation. The detection of slits is effected by co-operation of a light source and photoelectric conversion elements disposed on the opposite sides of the slits of the disk.

An electronic digital weighing apparatus according to this invention causes a pair of output pulses electrically displaced 90° in phase from each other to be produced out of a pair of photoelectric conversion elements. The paired pulses displaced 90° in phase are supplied to an analog-digital converter 12 (hereinafter referred to as an "A-D converter") to be amplified and shaped. In the A-D converter there are generated by logical circuit count up pulses (hereinafter referred to as "CU pulses") and count down pulses (hereinafter referred to as "CD pulses") to be supplied to an UP-DOWN counter 13. The CU pulses are produced when the slitted disk makes a normal rotation in weighing an object to cause the UP-DOWN counter 13 to count up. The CD pulses are generated when the slitted disk makes a reverse rotation in weighing an object to cause the counter 13 to count down. The counter 13 accurately counts pulses corresponding to the weight of an object, whether the slitted disk makes a normal or reverse rotation according to the shaking of a weighing dish when the object is weighed. The contents of the counter 13 after the stop of the slitted disk digitally indicates the weight of an object. If the weighing apparatus is so designed as to cause each disk slit to represent five grams and weigh an object up to 4000 grams, then the UP-DOWN counter 13 consists of a 1-bit element, for the first place, 4-bit elements for the second place, 4-bit elements for the third place and 2-bit elements for the fourth place.

Output signals from the elements of the respective bits constituting the counter 13 are conducted in parallel to a parallel-serial converter 14 together with timing signals to be converted into serial output signals. Serial output signals from the parallel-serial converter 14 are supplied to a weight shift register 15 (hereinafter referred to as "W register") where there is generated from the later described control circuit 26 a signal ordering weight data to be written. The W register 15 stores information by a binary coded decimal code (hereinafter referred to as "BCD code"), and has the same number of places as the counter 13, that is, four places. However, the W register 15 comprises elements of 16 bits. The register 15 has its stored information shifted to the right one place after another by shift pulses from a shift pulse generator 30, the information being circulated by a feed back line 16. The contents of the W register 15 disposed at the least significant digit (hereinafter referred to as "LSD") are supplied in turn to a data selector 31.

To set a unit price per unit weight, there is provided a keyboard section 17 including ten keys. When the keyboard 17 is operated, the unit price is written in a unit price shift register 18 (hereinafter referred to as "U register") in the order in which there are arranged digits constituting the price. Like the aforementioned W register 16, this U register 18 stores information by the BCD code and has the information shifted one place after another by shift pulses, the information being circulated by a feedback line 19. Assuming that a unit price per unit weight consists of a number having three places at most, the U register 18 is formed of elements of 12 bits. As in the W register 15, the contents of the U register 18 at the LSD are conducted to the data selector 31.

There is provided a price register 20 (hereinafter referred to as "P register") constituting part of a multiplication circuit for multiplying a unit price by a total weight. This P register 20 also stores information by the BCD code. Where a weighing apparatus is designed to handle a price having a number consisting of five places, the P register is formed of elements of 20 bits. As in the W and U reisters 15 and 18, the contents of the P register 20 at LSD are supplied to the data selector 31.

The contents of the W register 19 at the LSD and those of the P register 20 are conducted to a full adder 21 to be summed up. The results of addition by the full adder 21 are indicated by a binary code, and supplied to a binary-decimal corrector 22 for conversion to the BCD code. The BCD code thus converted is brought back to the most significant digit (hereinafter referred to as "MSD") of the P register 20 by a feedback line 23. Multiplication is effected by adding the contents of the W register 15, to the contents of the P register 20 by a number of times equal to the contents of the U register 18. It will be noted that the information stored in the P register 20 is initially zero.

There is provided a first counter 24 to count the times by which the contents of the W register 15 and those of the P register 20 are summed up. There are provided a zero detector and coincidence circuit 25 to detect that the content of the counter 24 and that of the U register 18 at the LSD coincide with each other and that the content of the U register at the LSD is zero. When the content of the U register 18 at the LSD coincides with that of the counter 24, then a control circuit 26 generates a place shift signal in response to output from the coincidence circuit 25. Shift pulses generated by the shift pulse generator 30 upon receipt of the place shift signal cause the contents of the P register 20 and those of the U register 18 to be shifted one place after another. The number of shift signals generated by the control circuit 26 is counted by a second counter 27 for counting the number of times by which the contents of the P and U registers 20 and 18 are shifted. When the second counter 27 counts three shift signals in the case the U register 18 is designed to store numbers up to three places, then the control circuit 26 gives forth a signal ordering multiplication to be stopped. When there is generated a shift signal, the first counter 24 is reset, its contents being reduced to zero. The control circuit 26 generates according to the contents of the second counter 27 various control signals such as write-in signal, operation-start signal or operation-stop signal so as to close or open the related gates.

Figure 2:
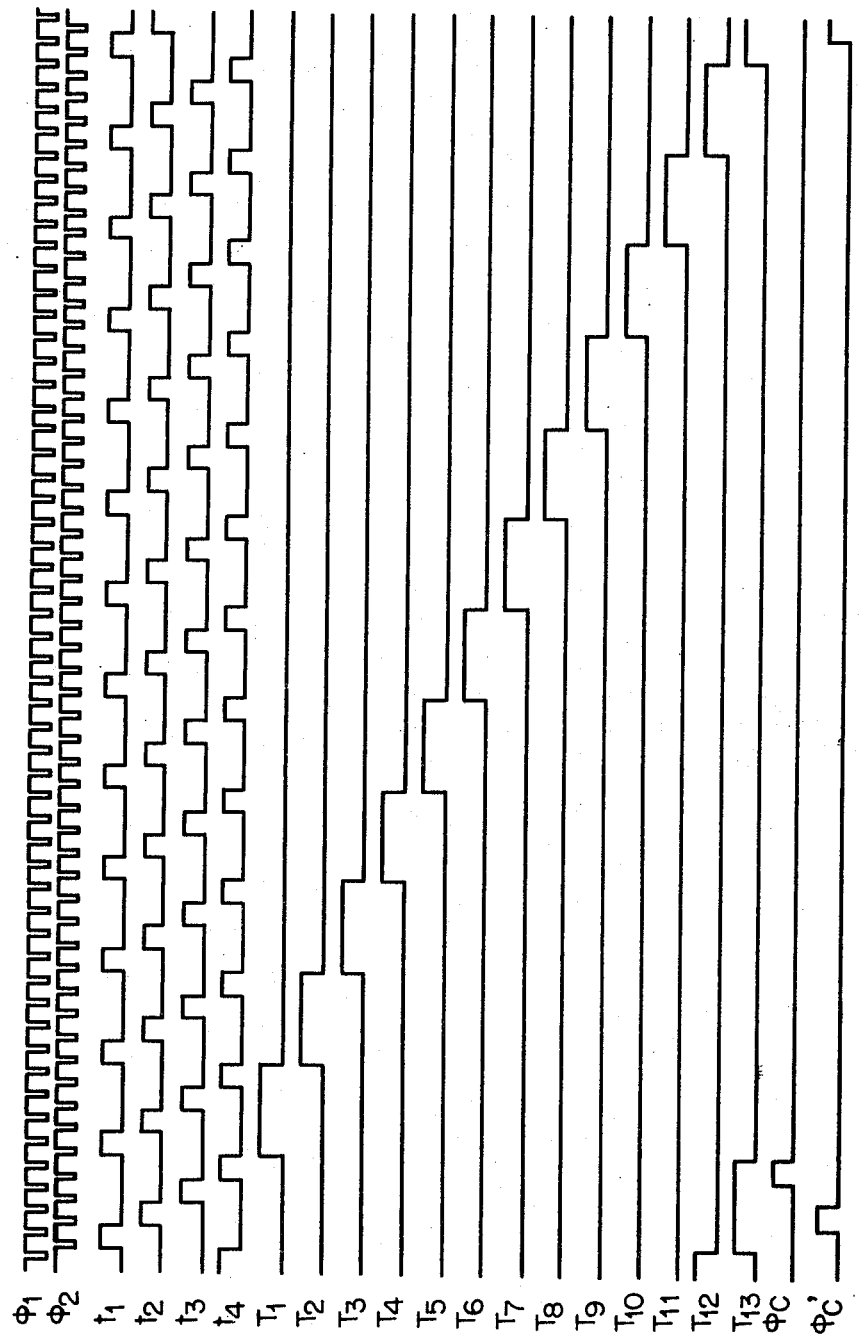
FIG. 2 represents the wave forms of various timing signals.

A clock pulse generator 28 generates shift pulses $\phi_1$ and $\phi_2$ shown in FIG. 2 to actuate the shift registers and controls a timing signal generator 29 to produce various timing signals.

The timing signal generator 29 produces as shown in FIG. 2 digit signals $T_1$ to $T_{13}$ each representing one decimal digit, bit signals $t_1$ to $t_4$ each denoting one binary digit and cyclic signals $\phi_c$ and $\phi_c'$ indicating a full period of time corresponding to one word length. It will be noted that since one digit of the register consists of four bits, each digit signal has a length of time four times that of a bit signal.

The shift pulse generator 30 supplies the W, P and U registers 15, 20 and 18 with shift pulses (clock pulses) during desired period of time upon receipt of signals from the control circuit 26 and timing signal generator 29.

The data selector 31 to which there are jointly conducted the contents at the LSD of the W, P and U registers 15, 20 and 18 has the contents of these registers to be supplied in turn to a 4-bit memory 32 by digit signals for a predetermined period of time. For example, where the W register 15 consists of four digits, its contents at the LSD are supplied to the 4-bit memory 32 while there are supplied digit signals $T_1$ to $T_4$. Where the P register 20 consists of five digits, its contents at the LSD are conducted to the memory 32 while there are generated digit signals $T_5$ to $T_9$. Where the U register 18 consists of three digits, its contents at the LSD are supplied to the memory 32, while there are generated digit signals $T_{10}$ to $T_{12}$.

The 4-bit memory 32 stores a content of the respective digits supplied from the respective registers for one digit time and conducts the content to a decoder 33.

This decoder 33 converts the BCD code received from the 4-bit memory 32 to a decimal code (0, 1, 2, – 8, 9). The decoder 33 is connected to ten driver circuits 34 to actuate display tubes 35. These display tubes 35 consist of 12 units in all to match the four digits of the W register 15, the five digits of the P register 20 and the three digits of the U register 18. The common numerical cathodes of the display tubes 35 are jointly connected to the corresponding driver circuits.

The digit selector 36 supplies voltage to the anodes of the twelve display tubes 35 in turn for their lighting. The anodes of the display tubes 35 are connected to the corresponding gate circuits included in a digit selector 36 which are successively impressed with digit signals $T_2$ to $T_{13}$ to be rendered conductive, thereby applying lighting voltage to the anodes of the display tubes 35. The gate circuits con-nected to the four weight display tubes are respectively supplied with the digit signals $T_2$ to $T_5$ corresponding to the digits of the weight display tubes, the gate circuits connected to the five price display tubes are respectively impressed with the digit signals $T_6$ to $T_{10}$ corresponding to the digits of the price display tubes, and the gate circuits connected to the three unit price display tubes are respectively supplied with digit signals $T_{11}$ to $T_{13}$ corresponding to the digits of the unit price display tubes. Accordingly, the anodes of the twelve display tubes 35 are successively supplied with lighting voltage by the digit signals $T_2$ to $T_{13}$. When there is selected by output from the decoder 33 one of the driver circuits of the ten display tubes 35, then there occurs a discharge across the anode of that display tube which is supplied with lighting voltage and the numerical cathode connected to the selected circuit to light the cathode. While the 12 display tubes 35 are actually lighted in turn, they seem to be lighted at the same time to the naked eye due to the lighting being switched at an exceedingly high speed.

There is omitted further description of the aforesaid data selector 31, 4-bit memory 32, decoder 33, driven circuits 34, digit selector 36 and display tubes 35 which are already well known to those skilled in the art.

This invention further includes a reset circuit 37 for resetting, as later described, the UP-DOWN counter 13 when a power source is initially actuated and when there is deducted the weight of a tare if an object to be weighed is enclosed therein, and for resetting all the registers when a power source is initially actuated.

To have the weight, and total and unit prices indicated on a sheet, there may also be provided a printer 38 integrally with or separately from the weighing apparatus. This printer 38 is supplied with output from the data selector 31 and various timing signals. Where there is used the printer 38, it is necessary to have the weight of an object to be previously stored in the W register 15. Where, however, there are provided only display tubes without using the printer, then the W register 15 may be omitted. In such case, the contents of the UP-DOWN counter 13 are supplied, as shown in FIG. 1A, through the parallel-serial converter 14 to the data selector 31 and to an AND circuit 39. When the AND circuit 39 receives from the control circuit 26 a signal ordering addition, then the contents of the parallel-serial converter 14 are obtained from the AND circuit 39. The output is serially supplied to the full adder 21 to be added to the contents of the P register 20. This procedure enables the information stored in the UP-DOWN counter 13 to be used in display and operation, offering the advantage of eliminating the use of hardware such as the W register 15.

FIGS. 3A and 3B are external views of a weighing apparatus according to this invention; FIG. 3A represents the aspect of the apparatus as viewed from a seller; and FIG. 3B shows the same as viewed from a buyer. Referential numeral 40 is a weighing board on which there is to be mounted an object to be weighed. Above the body of the weighing apparatus is disposed a display portion 42 for indicating the weight, and total and unit prices of the object. These indications are made by electronic display tubes. The front side of the weighing apparatus which faces the seller is provided with ten keys 43 for storing the unit price of the object in the U register 18, a clear key 44 for clearing the contents of the U register 18 and a key 45 for having the weight of a tare deducted. There is further provided the later described indicator 46. To the underside of the weighing apparatus is fitted a zero set knob 47 for the reason given later.

There will now be described by reference to FIGS. 4A to 4E the weight detector 11. Numeral 50 denotes an apparatus stand, which comprises a vertical leg 51, and a support plate 52 and a base plate 53, which are both horizontally extended from the top and bottom of the leg 51 respectively. Between the support and base plates 52 and 53 is rotatably disposed a disk 54, which is made to rotate by engagement between a rack 55 and a pinion 56. In the peripheral portion of the disk 54 are formed a large number of slits 57 at an equal interval.

To the side of the leg 51 is projectively fitted a board 58 for holding photoelectric conversion members. At the top of the board 58 is detachably disposed a photoelectric conversion portion 60 through a cylindrical spacer 59 by means of fixing means 61, for example, a screw. The photoelectric conversion portion 60 has a light-receiving plate 62 and a light-emitting plate 63 spatially facing each other. The aforesaid disk 54 is so designed as to rotate through an interspace between both plates 62 and 63. The light-emitting plate 63 is fitted with a light generator 64, for example, an electric bulb. The light-receiving plate 62 is provided with a pair of photoelectric conversion elements 65 and 66 such as phototransistors, photodiodes, CdS's or solar batteries.

Figure 4B:
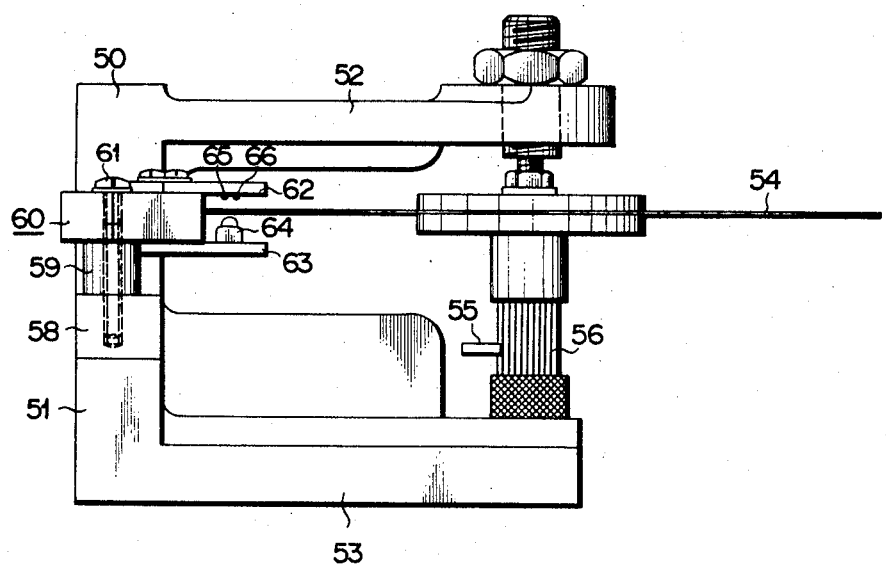
Figure 4C:
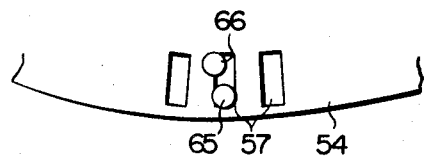
Figure 4D:
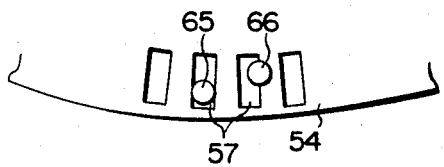
Figure 4E:
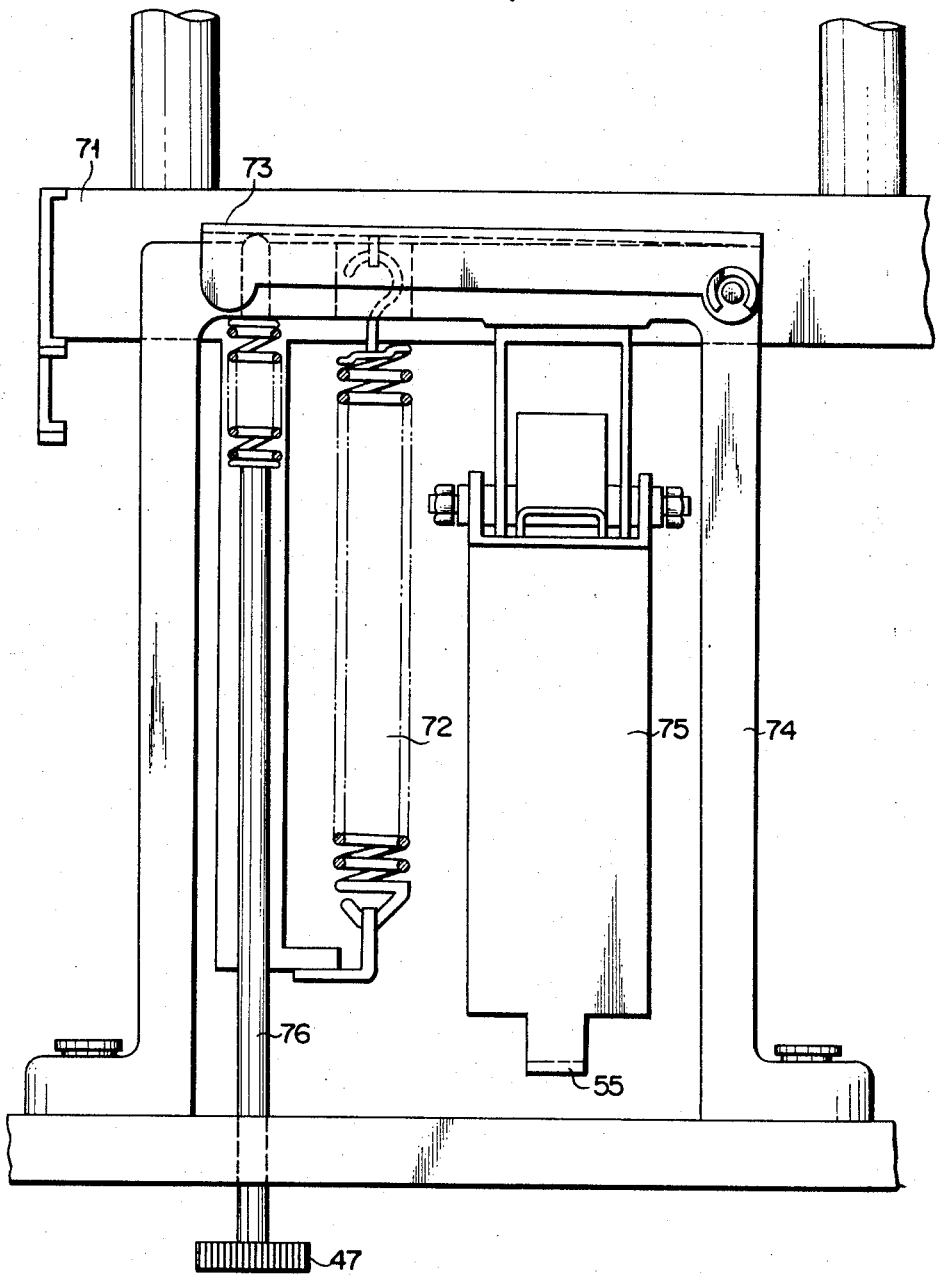

To obtain electric signals displaced 90° in phase from the paired photoelectric conversion elements 65 and 66, their relative positions are determined in such a manner, as shown in FIG. 4C, that when the center of one photoelectric conversion element 65 is aligned with that of one of the disk slits 57, the center of the other photoelectric conversion element 66 is brought to the edge of the same slit 57, or, as shown in FIG. 4D, that when the center of one photoelectric conversion element 65 agrees with that of one of the disk slits 57, the center of the other element 66 falls on the edge of the adjacent slit.

A mechanism for rotating the slitted disk 57 is operated by the same principle as the conventional mechanical weighing apparatus. Accordingly, there will now be described by reference to FIG. 4E a mechanism associated with the zero set knob 47 shown in FIG. 3A. When there is placed an object on the weighing board 40, the first lever 71 rotates to cause a spring 72 fixed at one end to the lever 71 to extend downward. The spring 72 is fixed to the other end to a rod 73 rotatably supported at one end on the top of a frame member 74. A first lever 71 and a second lever 75 fixed thereto at one end jointly rotate, causing the rack 55 attached to the other end of the second lever 75 to be also urged with the resultant rotation of the slitted disk 54. The slitted disk 54 continues rotation until the spring 72 is loaded to an extent equal to the weight of an object, causing electric signals to be generated by the paired photoelectric conversion elements 65 and 66. As later described, it is preferred that the width of the light-receiving surface of the photoelectric conversion elements 65 and 66, that of each slit 57 and the interslit space be all equal.

Numeral 76 is a zero set rod, one end of which is connected to the zero set knob 47 and the other end of which penetrates the upper part of the frame 74 to cause the rod 73 to be slightly rotated by the turn of the knob 47. The turn of the knob 47 slightly extends the spring 72, with the resultant slight rotation of the second lever 75 and consequently the slitted disk 54, thereby controlling the relative positions of the photoelectric conversion elements 65 and 66 and the slits 57.

There will now be described the A–D converter 12 by reference to FIG. 5. There is brought light from the source 64 through the slits 57 to a pair of photoelectric conversion elements, for example, phototransistors 65 and 66. Output signals from these phototransistors are conducted through emitter followers 81 and 82 to Schmitt circuits 83 and 84 consisting of transistors $T_{r1}$ and $T_{r2}$. Output A from the Schmitt circuit 83 is connected to a first differentiator 85 and to a second differentiator 87 through an inverter 86. Ouput dA/dt from the first differentiator 85 is connected to a first AND gate 88 and a third AND gate 90, and output $\overline{dA/dt}$ from the second differentiator 87 to second and fourth AND gates 89 and 91. Output B from the Schmitt circuit 84 is connected to the second and third AND gates 89 and 90 and also through an inverter 92 to the first and fourth AND gates 88 and 91. Outputs dA/dt·$\overline{B}$ and $\overline{dA/dt}$·B from the first and second AND gates 88 and 89 are connected to a first OR gate 93. Outputs dA/dt·B and $\overline{dA/dt}$·$\overline{B}$ from the third and fourth AND gates 90 and 91 are connected to a second OR gate 94.

The wave forms of output signals from the various sections of the A-D converter are presented in FIG. 6. The wave forms shown on the left side of the central broken line of the figure are those appearing when the slitted disk 54 makes a normal rotation and those on the right side are generated when the slitted disk 54 rotates in a reverse direction.

As seen from FIG. 6, output dA/dt·$\overline{B}$ + $\overline{dA/dt}$·N from the first OR gate 93 which is connected with output dA/dt·$\overline{B}$ from the first AND gate 88 and output $\overline{dA/dt}$·B from the second AND gate 89 is generated only when the slitted disk 54 makes a normal rotation. The aforesaid output dA/dt·$\overline{B}$ + $\overline{dA/dt}$·B from the first OR gate 93 is a CU pulse for causing UP-DOWN counter 13 to count up. Output dA/dt·B + $\overline{dA/dt}$·$\overline{B}$ from the second OR gate 94 is obtained only when the slitted disk 54 rotates in a reverse direction and is a CD pulse for causing the UP-DOWN counter to count down.

The emitter of one emitter follower 81 is provided with an indicator 46 such as an ammeter or voltmeter. This indicator 46 is required in the following case. With the weighing apparatus of this invention, the tare weight of an object is weighed before the object itself is weighed and counted by the UP-DOWN counter 13. The tare weight measured by the UP-DOWN counter is reset by the tare weight deducting circuit with the mechanical displacement of the slitted disk unchanged, before the net weight of the object is determined. If, in this case, the slit width and interslit space are broader than the light receiving surface of the photoelectric conversion element, there will occur errors in measuring the net weight of an object depending on the relative position of the slit and photoelectric conversion element. Assuming that one slit represents five grams, then there will arise an error or 5 grams in the weight determined. If, therefore, the slit width and interslit space are made equal to the light receiving surface of the photoelectric conversion element, then the indicator will indicate a maximum value when the light receiving surface coincides with the slit and a minimum value when the surface is aligned with the interslit space. Accordingly, if, after deduction of the tare weight, the relative position of the slitted disk and photoelectric conversion element are so adjusted as to cause the indicator to indicate a maximum or minimum value according to the aforesaid manual operation of the knob 47, then the relative positions will be maintained in a predetermined relation to prevent the occurrence of weighing errors.

If the slit width and interslit space are made equal, as previously described, to the light receiving surface of the photoelectric conversion element, then an output signal from the photoelectric conversion element will assume a sine wave form, the signal being further shaped by the Schmitt circuits 83 and 84.

When there is placed an object on the weighing board, the slitted disk of a weighing apparatus is not readily brought to a stable condition due to the effect of wind. In such case, the A-D converter 12 repeatedly generates CU and CD pulses to prevent the contents of the UP-DOWN counter 13 from being fixed, most likely causing weight indication to waver. These difficulties can be resolved by imparting hysteresis characteristics to the Schmitt circuits 83 and 84. Namely, it is only required to let the collector resistors $R_1$ and $R_2$ of the transistors $T_{r1}$ and $T_{r2}$ constituting the Schmitt crcuits 83 and 84 to have different resistance values in order to cause the circuits to be turned on and off at different levels $L_{ON}$ and $L_{OFF}$. Where $V_{CC}$ has 20 volts, use of the collector resistor $R_1$ having a resistance value of about 18 kΩ and the collector resistor $R_2$ having a resistance value of about 8 kΩ will produce a level difference of about 3 volts. It is, however, sufficient that on by the Schmitt circuit 83 will be provided with the hysteris is characteristics.

Where the Schmitt circuit thus arranged is supplied, as shown in FIG. 7, with input pulses $P_2$, $P_3$ and $P_4$ in addition to an input pulse $P_1$, the circuit only generates an output pulse $Q_1$ corresponding to the input pulse $P_1$ and an output pulse $Q_2$ corresponding to the input pulse $P_2$, thereby reducing the wavering of indication.

FIG. 8 shows a modification of the A-D converter of FIG. 5. Output A of the first Schmitt circuit 83 is connected to a first differentiator 95, the output dA/dt from which is connected to first and fourth AND gates 101 and 104. The output A is directly connected to fifth and sixth AND gates 105 and 106 and further to a second differentiator 97 through an inverter 96. Output $\overline{dA/dt}$ of the second differentiator 97 is connected to the second and third AND gates 102 and 103, and output $\overline{A}$ of the inverter 96 is conducted to seventh and eighth AND gates 107 and 108.

Output B of the second Schmitt circuit 84 is supplied to a third differentiator 98, output dB/dt of which is connected to the fifth and eighth AND gates 105 and 108. The output B is directly connected to the third and fourth AND gates 103 and 104 and further to a fourth differentiator 100 through an inverter 99. Output $\overline{dB}/dt$ of the fourth differentiator 100 is connected to the sixth and seventh AND gates 106 and 107, and output $\overline{B}$ of the inverter 99 is connected to the first and second AND gates 101 and 102.

Output $dA/dt \cdot \overline{B}$ of the first AND gate 101, output $dA/dt \cdot B$ of the third AND gate 103, output $dB/dt \cdot A$ of the fifth AND gate 105 and output $d\overline{B}/dt \cdot A$ of the seventh AND gate 107 are all connected to a first OR gate 109. Output $\overline{dA}/dt \cdot \overline{B}$, $dA/dt \cdot B$, $dB/dt \cdot \overline{A}$ are connected to a second OR gate 110. The wave forms of output signals from the various sections of the embodiment of FIG. 8 are presented in FIG. 9. Output signal from the first OR gate 109 is in the form of CU pulses obtained only when the slitted disk makes a normal rotation and output signal from the second OR gate 110 is in the form of CD pulses obtained only when the slitted disk makes a reverse rotation.

Comparison of FIGS. 6 and 9 will clearly show that the A-D converter of FIG. 8 produces output pulses in a number two times those obtained with the embodiment of FIG. 5. This means that where there is used the same type of weighing apparatus, the A-D converter of FIG. 8 can attain weighing precision twice that of FIG. 5. Assuming, therefore, that the A-D converter can realize the same degree of weighing precision as that of FIG. 5, the A-D converter of FIG. 8 allows the slit width of the disk to the twice larger than that of FIG. 5, thus facilitating the fabrication of the slitted disk.

There will be described the UP-DOWN counter 13 by reference to FIGS. 10 and 11. Let it be assumed that one slit of the slitted disk represents 5 grams as previously described and a weighing apparatus has a maximum weighing capacity of 4000 grams. Then the UP-DOWN counter 13 may consist of a binary counter of one bit for the first place, decimal counters each of four bits for the second and third places respectively and a binary counter of 2 bits for the fourth place. FIG. 10 represents a binary counter of 1 bit for the first place. Numeral 115 is a one bit shift register comprising a first flip-flop circuit 116 consisting of MOS transistors, $Q_2 Q_3$, $Q_4$, $Q_5$ and $Q_6$ and a second flip-flop circuit 117 consisting of MOS transistors $Q_8$, $Q_9$, $Q_{10}$ and $Q_{11}$, and a resistor $R_L$. $Q_1$ and $Q_7$ denote control MOS transistors. Output terminal 0 of the second flip-flop circuit 117 is connected through an inverter 118 to the input terminal I of the first flip-flop circuit. CU and CD pulses are conducted through an OR gate 119 and inverter 120 to the gates of the MOS transistors $Q_1$ and $Q_{11}$. Output from the OR gate 119 is supplied to the MOS transistors $Q_6$ and $Q_7$. CU pulses, together with output from the shift register 115, are supplied to a first AND gate 121 and CD pulses, together with output from the inverter 118, are sent to a second AND gate 122.

There will now be described the operation of a circuit associated with the UP-DOWN counter 13. Assuming that output from the second flip-flop circuit 117 or shift register is "0", then input to the first flip-flop circuit 116 or shift register is "1". When, under this condition, there is received one CU pulse, the MOS transistor $Q_1$ is rendered conductive by output from the inverter 120, causing the first flip-flop circuit 116 to produce output 1. Since, however, the MOS transistor $Q_7$ is turned off by the CU pulse, output from the first flip-flop circuit 116 is not transmitted to the second flip-flop circuit 117. Therefore, the second flip-flop circuit 117 continues to produce output 0. Upon disappearance of the CU pulse, the MOS transistor $Q_7$ is rendered conductive, causing output 1 from the first flip-flop circuit 116 to be conducted to the second flip-flop circuit 117. When there is received a CU pulse again, the pulse is supplied through the first AND gate 121 to the immediately higher decimal counter for the second place as a digit carry pulse. Since, at this time, input to the shift register 115 is rendered 0 by the inverter 118, the first flip-flop circuit 116 produces output 0. Upon disappearance of the CU pulse, output of the first flip-flop circuit 116 is conducted to the second flip-flop circuit 117, causing it to generate output 0.

There is now described the case where there are received CD pulses. Assuming that output from the shift register 115 is 1, then input thereto is 0. Upon receipt of one CD pulse, therefore, the first flip-flop circuit produces output 0. Upon disappearance of the CD pulse, output from the second flip-flop circuit is rendered 0. Since output from the inverter 118 is 1, the CD pulse is supplied through the second AND gate 122 to the next lower digit as a borrow pulse.

When four units of a 1 bit binary counter shown in FIG. 10 are cascade connected to constitute 4 bits, then there is obtained a hexadecimal counter. With addition of a proper correction means, there can be provided a decimal counter shown in FIG. 11.

When the content is shifted from 9 to 0, the AND gate $A_1$ is supplied with "not" output from a shift register D, thereby causing a shift register B to remain stored with 0. An OR gate $O_2$ causes the shift register D to maintain a content of 0 by a decimal carry output, AND gates $A_2$ and $A_3$, as well as the OR gate $O_1$, are used to cause the shift registers B and C to continue to generate 0 output when the content is changed from 0 to 9 in subtraction.

With the weighing apparatus of this invention, there is first placed only the tare of an object on the weighing board and, with the indication of the tare weight set at zero, the desired net weight of an object is shown in digits. When the object with its tare is removed from the weighing apparatus, the resulting indication is made in the form of the complement of the tare weight to a total counted value. For example, where the tare weight is determined to be 10 grams on a weighing apparatus which has capacity of a total weight of 4000 grams, the indication on the apparatus after the removal of the tare will give a value of 3990grams. If, in this case, the tare weight is indicated as 10 grams, it will greatly assist understanding. Therefore, it is preferred that the UP-DOWN counter be so designed to carry out weighing in absolute values.

FIG. 12 illustrates an UP-DOWN counter for always counting absolute values for the above-mentioned purpose. AND gates 123 and 124 are jointly supplied with a zero detecting signal Z and respectively with CU and CD pulses. Output of the AND gate 123 impressed with the CU pulse is connected to the set terminal S of a flip-flop circuit 125. Output of the AND gate 124 supplied with the CD pulse is connected to the reset terminal R of the circuit 125, the set output Q from which is connected to AND gates 126 and 129. The AND gate 126 is impressed with CU pulses and the AND gate 129 with CD pulses. Reset output $\overline{Q}$ of the flip-flop circuit 125 is connected to AND gates 127 and 128. The AND gate 127 is supplied with CD pulses and the AND gate 128 with CU pulses. Output of the AND gates 126 and 127 is connected to the UP-DOWN counter 13 as addition input and output of the AND gates 128 and 129 is connected to the counter 13 as subtraction input.

Upon receipt of CU pulses where the content of the UP-DOWN counter 13 is zero and the zero detecting signal Z is 1, then the flip-flop circuit 125 is set through the AND gate 123. Accordingly, the CU pulse causes the counter 13 to count up through the AND gate 126. Upon receipt of CD pulses, the counter 13 is made to count down through the AND gate 129. When the content of the counter 13 is reduced to zero, the zero detecting signal Z is brought again to 1, and a CD pulse resets the flip-flop circuit 125. Upon receipt of reset output from the flip-flop circuit 125, the CD pulses cause the counter 13 to count up through the AND gate 127. Thus it will be apparent that the UP-DOWN counter 13 always counts absolute values.

Set and reset outputs of the flip-flop circuit 125 can be used in indicating a code constituting the content of the counter 13. As the zero detecting signal Z a signal obtained by supplying output from an OR gate 143 shown in FIG. 13 to an inverter may be utilized.

The weighing apparatus of this invention is provided with a device which, when the content of the counter is not reduced to zero due to the displacement of the zero position of the mechanical arrangement resulting from, for example, the mechanical distortions of the apparatus, enables the content of the counter to be automatically brought back to zero.

FIG. 13 shows a weighing apparatus including such device. There will now be described the case where there is automatically brought back to zero a minimum unit of ±5 grams counted by the weighing apparatus of this invention wherein a single pulse denotes 5 grams.

As previously mentioned, the counter 13 consists of a 1-bit binary counter for the first place, 4-bit decimal counter for the second and third places and a 2-bit binary counter for the fourth place. Referring to FIG. 13, the individual bit elements are designated as A, B, C, D, E, F, G, H, I, J and K. When the counter 13 counts +5 grams, the resulting condition $W_{+5}$ may be indicated by the following logical expression:

$$W_{+5} = A \cdot \overline{B} \cdot \overline{C} \cdot \overline{D} \cdot \overline{E} \cdot \overline{F} \cdot \overline{G} \cdot \overline{H} \cdot \overline{I} \cdot \overline{J} \cdot \overline{K}$$

Where the counter 13 counts −5 grams, it will be in a state representing 3995 grams. The condition of −5 grams may be denoted by the following logical expression:

$$W_{-5} = \overline{A} \cdot B \cdot E \cdot F \cdot I \cdot J \cdot K$$

Therefore, the condition of the counter when it has counted +5 and −5 grams may be shown by the following logical formula:

$$W_{+5} + W_{-5} = A \cdot \overline{B} \cdot \overline{C} \cdot \overline{D} \cdot \overline{E} \cdot \overline{F} \cdot \overline{G} \cdot \overline{H} \cdot \overline{I} \cdot \overline{J} \cdot \overline{K} + \overline{A} \cdot B \cdot E \cdot F \cdot I \cdot J \cdot K$$
$$= \overline{\overline{A}+B+C+D+E+F+G+H+I+J+K} + \overline{A+\overline{B}+\overline{E}+\overline{F}+\overline{I}+\overline{J}+\overline{K}}$$
$$= \overline{(\overline{A}+B+C+D+E+F+G+H+I+J+K)(A+\overline{B}+\overline{E}+\overline{F}+\overline{J}+\overline{K})}$$

The above formula represents the logic of a circuit for detecting the information of +5 and −5 grams stored in the counter 13. To form a logic $\overline{A+\overline{B}+\overline{E}+\overline{F}+\overline{J}+\overline{K}}$ outputs of the elements A, B, E, F, J and K are jointly connected to a first OR gate 132 through an inverter 131. To constitute a logic $\overline{\overline{A}+B+C+D+E+F+G+H+I+J+K}$, outputs of the elements B, C, D, E, F, G, H, I, J and K are jointly connected to a second OR gate 133. Output of the element A, together with output of the OR gate 133, is connected to a third OR gate 134. Outputs of the first and third OR gates 132 and 134 are connected to a first AND gate 135, output of which is connected through an inverter 136 to a timer circuit 137 for its control. Output of the inverter 136 is indicated by the aforesaid logic $W_{+5} + W_{-5}$.

If the content of the counter is found to result from weighing errors, the content is left intact for over a constant length of time, so that the timer circuit 137 is so designed as to generate only after the lapse of the time a singal showing that the counter content originated with weighing errors. Output from the inverter 136 renders a transistor 138 conductive, causing a condenser 139 to be charged to attain a power source voltage with a certain time constant. If output from the inverter 136 extinguishes itself relatively early, the condenser 139 will not be fully charged. If the voltage charged in the condenser 139 exceeds the threshold level of a Zener diode 140, then a transistor 141 will be turned on, causing output from the timer circuit 137 to be changed from negative to zero. Output of the timer circuit 137 is connected to an AND gate 142. Output of the second OR gate 133, together with output of the element A, is connected to a fourth OR gate 143. Output of the OR gate 143 showing that the counter content is not zero is connected to the AND gate 142, which is supplied with output from a clock pulse generator. Output of the AND gate 142 is connected to AND gates 144 and 145. The AND gate 145 is impressed with output from the first OR gate 132, and the AND gate 144 is supplied through an inverter 146 with output from the OR gate 132. Output from the AND gate 144, together with CU pulses, is conducted to an OR gate 147 and output from the AND gate 145, together with CD pulses, is supplied to an OR gate 148.

Where the counter 13 has a content of +5 grams, the AND gate 142 is impressed with output from the timer circuit 137 as well as that from the OR gate 143. Thus output from the AND gate 142, so that the resulting output is in the form of clock pulses generated by a clock pulse generator. Since output from the first OR gate 132 is 1, the clock pulse is supplied to the OR gate 148 through the AND gate 145 to bring counter content back to zero by count down.

Where the counter content is −5 grams, that is, 3995 grams output from the first OR gate 132 is 0, so that the clock pulse is supplied through the AND gate 144 to the OR gate 147 to restore the counter content to zero by count up.

Outputs from the bit elements constituting the UP-DOWN counter 13 are supplied to the AND gates 151 to 162 of the parallel-serial converter 14 arranged as shown in FIG. 14 together with bit signals $t_1$ to $t_4$ and digit signals $T_1$ to $T_4$ to be converted to a serial output. Since the parallel-serial converter is well known, detailed description thereof is omitted. Output of the first place bit element of the counter 13 is connected to AND gates 161 and 162. Both gates are supplied with a digit signal $T_1$ and the AND gate 162 is impressed with a bit signal $t_1$ and the AND gate 161 with a bit signal $t_3$. Since a single output pulse from the A-D converter denotes 5 grams, output 1 from the first place bit of the counter 13 represents 5 grams. To convert the output 1 to a BCD code 0101, the AND gate 162 is supplied with a bit signal $t_1$ and the AND gate 161 with a bit signal $t_3$.

The storing of a unit price in the U register is effected by the keyboard section 17 shown in FIG. 15. Depression of the ten keys 43 marked with numerals of 0 to 9 causes data to be stored in the U register in the form of the BCD code. Data of numerals 1 to 9 are converted to the repspective BCD codes by a diode matrix. Outputs from bits 1, 2, 4 and 8 constituting the BCD code are successively stored in the U register through AND gates 165, 166, 167 and 168. Accordingly, the AND gate 165 is supplied with the bit signal $t_1$, the AND gate 166 with the bit signal $t_2$, the AND gate 167 with the bit signal $t_3$ and the AND gate 168 with the bit signal $t_4$. The clear key 44 closes the circulation gate of the U register to clear its content. Depression of the clear key and at least one of the ten digital keys generates a control signal N.

When a power source is initially actuated and also when a tare weight is deducted, it is necessary to reset the UP-DOWN counter 13 and when the power source is actuated it is necessary to clear the contents of all registers. To this end there is provided a reset circuit 37 shown in FIG. 16. When the power source is operated, charging current in a condenser 171 passes through a resistor 172 and base resistor 173 to turn on a transistor 174. Output obtained at point $a$ from the collector of transistor 174 is a logical level 1. The voltage at point $a$ is transmitted through a diode 175 to the juncture b between a resistor 176 and tare weight deducting key 45. Therefore, output at point $b$ is also a logical level 1. Output at point $a$ is supplied through an inverter 177 to the circulation gate of the U register. When the power source is actuated, the circulation gate is opened to clear the U register. Output at point b is supplied to the AND gate 142 shown in FIG. 13. Upon operation of the power source, the counter 13 is supplied with clock pulses to have its content cleared. The zero content of the counter is stored in the W register. Logical operation causes the content or zero of the W register to be written in the P register to have its content also cleared.

When the condenser 171 is charged, the transistor 174 is rendered non-conductive and outputs at points a and b become a logical level 0. This condition lasts as long as power source is actuated. When the tare weight deducting key 45 is depressed under such condition, voltage at point $b$ is brought to a level corresponding to the logical level 1. This level is not transmitted to point a through the diode 175. Depression of the tare weight deducting key 45 causes the content of the counter 13 to be cleared by the clock pulses.

There will now be described the registers included in the weighing apparatus of this invention. The W register 15, P register 20 and U register 18 are each formed of a plurality of 1-bit shift registers connected in cascade relationship. While the 1-bit shift register may have the same arrangement as the 1-bit shift register of the UP-DOWN counter shown in FIG. 10, the shift pulses used are 2-phase clock pulses $\phi_1$ $\phi_2$ shown in FIG. 2. $\phi_1$ is a read-in pulse and $\phi_2$ is a read-out pulse.

The W register 15 stores the data of the UP-DOWN counter 13 and supplies the data to the adder circuit 21 with the intervals of $T_1$, $T_2$, $T_3$ and $T_4$ when there is generated an addition instruction $\oplus \cdot \overline{S}$, that is, a multiplication instruction $\oplus$ and not a shift instruction S. The W register has its circulation gate opened upon receipt of a read-in instruction R and closed on other occasions so as to cause its data to be transmitted from the LSD to the MSD. The W register is formed of four digits, so that for circulation of its data per cycle, its shift pulse $\phi_{1w}$ is generated by the shift pulse generator 30 in the form of the following logical formula:

$$\phi_{1w} = \phi_1 + \overline{T_1 + T_2 + T_3 + T_4}$$

The P register 20 is used for logical operation and is intended to store a partial product of the content of the W register 15 and that of the U register 18 and an answer (or price) obtained after operation. The P register 20 always has its data circulated through the adder circuit 21 and binary-decimal corrector 22. The P register 20 consists of five digits (20 bits) and the binary-decimal corrector 22 is provided with the later described four bit shift register so that the data of P register is circulated twice during the period of from $T_1$ to $T_{12}$ per cycle. The content of the P register 20 is not shifted during the time of $T_{13}$ but is circulated for the period of from $T_1$ to $T_6$ during multiplication (when the multiplication instruction $\oplus$ exists), and for the period of from $T_1$ to $T_{17}$ upon receipt of a right shift instruction S. The shift pulse $\phi_{1P}$ of the P register 20 is concurrently used as the shift pulse $\phi_{1U}$ of the U register 18 and generated by the shift pulse generator in the form of the following logical formula:

$$\phi_{1P} = \phi_1 + T_{13} + N_1\overline{N_2}T_{12} + (T_8 + T_9 + T_{10} + T_{11} + T_{12}) \cdot \oplus + T_7 \cdot \\ \oplus 18 \cdot S$$

Where:

$N_1\overline{N_2}$ = a signal derived from a signal N generated by the keyboard section shown in FIG. 15 which is required to shift the data already stored in the U register 18 by one place in order to receive new data therein. The circulation gate of the P register 20 is opened when the data read-in instruction R is generated or when the data is first shifted right by one digit to clear the content of the LSD of partial product during multiplication.

The storing of a unit price in the U register 18 is performed during the period of $T_1$, $T_2$, $T_3$ and $T_4$. The circulation gate of the U register is only opened during the period of $T_1$, $T_4$, $T_7$ and $T_{10}$, upon depression of the clear key or when the power source is actuated.

FIG. 17 shows the full adder 21 and binary-decimal corrector 22. The content of the W register 15 and that of the P register 20 are supplied to the binary full adder 21 so as to be summed up. Addition output $S_{01}$ is supplied to a 4-bit shift register 181 and one digit later to a full adder 182 included in the binary-decimal corrector 22. The shift register 181 is stored with the result of addition purely in the form of binary digits. Where the result of addition exceeds 10, there is produced output 1 at point a. Based on the output 1 there is generated output 6 at point b using bit time signals a. When the output 6 is supplied to the full adder 182, there is produced therefrom output $S_{02}$ of the BCD code. The process of adding the output 6 when the sum increases over 10 so as to be converted to the BCD code is already known and description thereof is omitted.

There will now be described by reference to FIG. 18 the method of multiplication. Let us take an example where the weight of an object, for example, 123 grams is stored in the W register 15 as shown in FIG. 18A and the U register 18 is stored with a unit price 12 cents per 100 grams of the weight. At this time, the P register 20 still remains unstored. P' of FIG. 18A denotes a register of 4 bits (1 digit) included in the binary-decimal corrector 22. The first and second counters $C_1$ and $C_2$ have its content reset to zero when the data read-in instruction R is generated. When there are stored data as shown in FIG. 18B, the content of the second counter $C_2$ is converted to 1 to generate a multiplication instruction ⊕. As a result, the content of the W register 15 is supplied to the P register 20 during one cycle, converting the content of the first counter $C_1$ to 1. Under this condition, the LSD 2 of the U register 18 does not coincide with the content 1 of the counter $C_1$. Therefore, the content of the W register 15 is again supplied to the P register 20 and converted to 00246 to cause the counter $C_2$ to have a content of 2, with the resultant agreement between the content of 2 and the LSD 2 of the U register 18. As a result, there is generated a right shift instruction S, causing the contents of the U and P registers 18 and 20 to be shifted by one place as shown in FIG. 18D. During this cycle, the first place digit 6 of the P register 20 is extinguished when it is shifted from the register P' to the MSD of the P register 20, that is, when the circulation gate is opened at time $T_2$. Thus the counter $C_1$ is reset and the content of the counter $C_2$ is turned to 2.

The LSD 1 of the U register 18 and the content 0 of the counter $C_1$ do not agree with each other. Therefore, the content of the W register 15 is supplied to the P register 20 as shown in FIG. 18E to cause the counter $C_1$ to have a content of 1 with the resultant agreement between the content of the counter $C_1$ and the LSD of the U register 18. As a result, there is generated a right shift instruction S, causing the contents of the U and P registers 18 and 20 to be shifted right by one place as shown in FIG. 18F. The first digit 7 of the P register 20 is cleared as in FIG. 18D. Thus the counter $C_1$ is reset and the content of the counter $C_2$ is changed to 3. Since the LSD of the U register 18 is 0, there is produced a right shift signal S, causing the contents of the U and P registers 18 and 20 to be shifted by one place as shown in FIG. 18G. The content of the counter $C_2$ is converted to 4 and there is generated a signal to indicate the completion of the aforementioned logical operation.

The content of the W register 15 is supplied, starting with the LSD, to a data selector 31 at the intervals of $T_1$, $T_2$, $T_3$ and $T_4$, indicating the weight 0123 grams of an object. The content of the P register 20 is supplied, starting with the fourth digit to the data selector at the intervals of $T_5$, $T_6$, $T_7$, $T_8$ and $T_9$, indicating the price of 00014 cents. The content of the U register 18 is supplied, starting with the LSD, to the data selector at the intervals of $T_{10}$, $T_{11}$ and $T_{12}$, indicating the unit price of 012 cents.

There will now be described the control circuit by reference to FIG. 19. According to the content of a second counter 27 the control circuit generates a read-in instruction R while the UP-DOWN counter 13 counts CU or CD pulses, multiplication instruction ⊕ extinguishment of the CU or CD pulses, and a multiplication stop instruction when the contents of the W and P registers 18 and 20 are shifted right a predetermined number of times.

Outputs $\overline{1}$, $\overline{2}$, $\overline{4}$ and $\overline{8}$ of the second counter 27 are all 1 when it has a content of 0. Each time there are received CP pulses, the content of counter 27 is changed as illustrated in FIG. 20. Where the U register 18 has an N number of digits, the second counter 27 generates a read-in instruction R when its content is 0. The second counter 27 generates a multiplication instruction ⊕ when its content is 1 and a multiplication stop instruction when it has a content of N+1.

Referring to FIG. 19, when the second counter 27 has a content of 0, there is generated by an inverter 185 a read-in instruction R. When the input gate of the W register 15 is closed by the read-in signal R, there is transferred information from the UP-DOWN counter 13 to the W register 15. The circulation gate of the W register 15 is opened by output R of OR gate 186 and the circulation gate of the P register 20 is opened by output of a NOR gate 187 supplied with the readin instruction R, thereby clearing the content of the P register. While there are generated CU or CD pulses, output of the later described timer circuit 240 is 1. This output is supplied to an AND gate 189 together with output 1 from an AND gate 188. Output 1 from the AND gate 189 is conducted through an AND gate 200 to the reset terminal R of the second counter 27 to keep it reset. Output 1 of the AND gate 200 sets an AND gate 201. Upon extinguishment of CU or CD pulses, that is, when the weight of an object is stored in the UP-DOWN counter 13 output of the timer circuit 240 and consequently the AND gate 189 is converted to 0. Since, however, the AND gate 201 is set, the reset terminal of the second counter 27 is supplied with 1 to remain reset. Upon receipt of a cycle signal $\phi_C$, the AND gate 201 is reset to release the reset condition of the second counter 27, thereby rendering it ready for counting. While there is stored a unit price in the U register 18, the keyboard section 17 generates a control signal N, which in turn is conducted to the AND gate 200 to reset the second counter 27. Under the condition where the second counter 27 has a content of 0, outputs of inverters 202 and 203 are 0. The cycle signal $\overline{\phi}_C$ renders the second counter 27 ready for counting through an OR gate 204 supplied with the aforesaid 0 output of the inverters 202 and 203. After one cycle is completed, a signal $\overline{\phi}_C'$ is supplied to an AND gate 205, which is supplied with a signal normally representing 1. Therefore, the signal $\overline{\phi}_C'$ is supplied, as a count pulse through the AND gate 205 to the second counter 27 to cause it to have a content of 1. Since, under this condition, output of the inverter 202 is 1, the count pulse $\overline{\phi}_C'$ is no longer supplied to the second counter 27. Output 1 of the inverter 202 is a multiplication instruction signal ⊕ for starting multiplication. Since output $\overline{R}$ of the OR gate 186 becomes 1, the content of the W register 15 is circulated. Since output R of the inverter 186 becomes 0, the input gate of the W register 15 is opened. The circulation gate of the P register 20 is closed by output 1 of the NOR gate 187 to cause its content to be circulated. A multiplication instruction signal ⊕ (1) and signal $\overline{S}$ (1) cause the AND gate 206 generate output 1, which in turn conducted through an AND gate 207 to close the input gate of the adder circuit 21. The input gate is connected to the W register 15 to cause its content to be successively supplied to the adder circuit 21 at the intervals of $T_1$, $R_2$, $T_3$ and $T_4$ so as to be added to the content of the P register 20.

When the second counter 27 counts the cycle signal $\overline{\phi}_C'$, the first counter 24 also counts the signal $\overline{\phi}_C'$. Output $\overline{1}$, $\overline{2}$, $\overline{4}$ and $\overline{8}$ of the first counter 24 are changed in the same manner as those of the second counter 27.

The first counter 24 counts the number of additions, when the content of the counter 24 coincides with the LSD of the U register 18, then the coincidence circuit 25 generates a coincidence signal $T_C$. Accordingly, outputs $\overline{1}, \overline{2}, \overline{4}$ and $\overline{8}$ of the first counter 24, together with the corresponding bit outputs representing the LSD of the U register 18 are supplied to the AND gates 208, 209, 210 and 211 of the coincidence circuit 25, outputs of which are jointly conducted to an inverter 212. The coincidence circuit 25 also detects whether the LSD of the U register 18 is zero or not. When the second counter 27 has a content of zero, the coincidence circuit 25 is locked by a diode 213 when there is generated the multiplication signal $\oplus$ (1). When the content of the second counter 27 is 1, output $\oplus$ is turned to 0 to unlock the coincidence circuit 25.

When the LSD of the U register 18 agrees with the content of the first counter 24 at the start of a cycle after addition has been made several times, then there is generated a coincidence signal $T_C$ (1) by an inverter 212. This coincidence signal $T_C$ (1) causes a shift signal S to be supplied to an AND gate 214 at an interval of $T_1 \times t_1 \times \phi_1$. The shift signal S is stored for a period of one cycle in an AND gate 215 having a storing function. The AND gate 215 is reset by a cycle signal $\bar{\phi}_C$. When output $\bar{S}$ of an inverter 216 impressed with the shift signal S is changed from 1 to 0, then there is conducted a negative trigger pulse as a count pulse to the second counter 27 through a differentiator 217 and the AND gate 205, causing the counter to have a content of 2. The cshift signal S resets the first counter 24.

When the content of the second counter 27 is converted to 2 upon generation of the shift signal S, an AND gate 218 produces output 1 for a period of $T_2$ during this cycle. When the NOR gate 187 is supplied with the output 1, the circulation gate of the P register 20 is opened, causing information stored in the shift register of the binary-decimal corrector 22 to be extinguished when it is conducted to the MSD of the P register 20. This corresponds to the case where one digit 6 of the P register 20 is deleted as shown in FIG. 18. Since, during this cycle, output $\oplus$ ·S of the AND gate 206 is 0, the contents of U and P registers 18 and 20 are shifted right by one place by shift pulses generated at intervals of $T_1$ to $T_7$.

In the succeeding cycle, the first counter 24 counts the cycle signal $\bar{\phi}_C'$. Later, as described above, the contents of the W and P registers 15 and 20 are added together. When the LSD of the U register 18 coincides with the content of the first counter 24, there is again generated a shift signal S to reset the first counter 24, and convert the content of the second counter 27 to 3. As in the previous case, the contents of the U and P registers 18 and 20 are shifted right by one place, and output $\bar{2}$ of the second counter 27 is still 0, so that the first digit of the P register 20 is cleared while it is conducted from the binary-decimal corrector 22 to the MSD. This corresponds to the case where there is cleared the first place digit 7 as shown in FIG. 18.

In the following cycle, the first counter 24 counts the cycle signal $\bar{\phi}_C'$. Where, however, the LSD of the U register 18 is 0, the coincidence circuit 25 generates output $T_C$. The resultant generation of a shift signal S causes the content of the second counter 27 to be converted to 4. At this time the contents of the U and P registers 18 and 20 are shifted right by one place. When the second counter 27 has its content changed to 4, then the inverter 203 generates a multiplication stop signal 1, preventing the cycle signal $\bar{\phi}_C'$ from being supplied to the second counter 27 through the OR gate 204. Accordingly, the counter 27 retains the content 4 until it receives a reset signal.

The resetting of the second counter 27 is effected by output of the timer circuit 240 derived from CU or CD pulses or a control signal N from the keyboard section 17 when there is stored a unit price. When, upon completion of logical operation, there is removed an object from the weighing board, the second counter 27 is reset, causing the contents of the W and P registers 15 and 20 to be cleared and reducing indication of these registers to zero. In the case where it is desired to continue indication after a weighed object has been taken off the weighing board, then there may be provided a memory key 219. Upon depression of the memory key 219, there is generated output 0 from an inverter 220, preventing a reset signal from being supplied to the second counter 27 through the AND gate 200. Where it is desired, after completion of logical operation, to record the contents of the respective registers on a receipt by means of a printer 38, it is also necessary to keep the condition of the second counter unchanged. In this case, a print signal P from the printer 38 and a signal generated by the memory key 219 may be conducted to an OR gate 221, output from which may be supplied to an inverter 220.

Where, there are generated CU or CD pulses, the second counter 27 is reset ready for the start of logical operation. When the CU or CD pulses are supplied intermittently, operation is repeated accordingly. In such case, indication of the contents of the respective registers is likely to waver. To avoid this, it is preferred that the reset condition of the second counter 27 be released in a certain length of time after extinguishment of CU or CD pulses. To this end there is provided the timer circuit 187.

CU or CD pulses are supplied through an OR gate 241 to the gate of a first MOS transistor 222 so as to render it conductive. As a result, a condenser 223 and the input capaci-tance of second MOS transistor 224 are charged through a diode 225 and resistor 226 to render the second MOS transistor 224 conductive, thereby converting the drain output of the second MOS transistor to 1. Upon extinguishment of CU or CD pulses, the first transistor 222 is turned on. In this case, the discharge of voltage charged in the condenser 223 is prevented from being conducted quickly due to a diode 225 being connected to the first transistor 222 in a reverse direction. Since the input resistance of the second transistor 224 is extremely high as is well known, the discharge is not performed rapidly. Accordingly, the second transistor 224 remains conductive and continues to produce output 1. When, however, the condenser 223 is gradually discharged and its voltage falls to a certain level after a certain length of time, then the second transistor 224 is turned off, causing output therefrom to be converted to 0.

FIG. 21 is a modification of FIG. 13. According to the embodiment of FIG. 21, when there are taken an object and its tare off the weighing board after deduction of the tare weight, a price which might be charged to the tare weight is prevented from being indicated. To this end, there is provided a tare weight detector 238 for detecting that the content of the UP-DOWN counter 13 represents nothing but the weight of a tare.

Output of the tare weight detector 230 closes the circulation gate 231 of the P register 20, to clear its content, preventing a price corresponding to the tare weight from being indicated.

What we claim is:

1. An electronic digital weighing apparatus having means for detecting the weight of an object in the form of an analog quantity; means for converting the analog quantity to a digital quantity; an UP-DOWN counter for counting said digital quantity; a parallel-serial converter for converting the content of said counter in serial form; means for setting the unit price of the object; a unit price register for storing data from said unit price setting means; a price register; means for adding together output of said parallel-serial converter and the content of said price register and having the results of addition stored in said price register; means for digitally indicating output of the parallel-serial converter and the contents of said price register and unit price register; and means for performing addition a number of times equal to the content of said unit price register including a first counter for counting the number of additions; a zero detector and coincidence circuit for generating a control signal where the least significant digit of said unit price register is zero or where it coincides with the content of said first counter; means for generating a shift signal so as to cause in response to said control signal the contents of said price register and unit price register to be shifted by one place; and a second counter responsive to the shift signal to be counted up to generate a signal to stop addition when the content thereof attains a predetermined value; said first counter being reset by the shift signal and said second counter being reset by a signal obtained according to the digital quantity.

2. A weighing apparatus according to claim 1 wherein output of said parallel-serial converter is stored in a weight register.

3. A weighing apparatus according to claim 1 wherein means for detecting the weight of the object in the form of an analog quantity and means for converting the analog quantity to a digital quantity comprise a disk having a plurality of slits bored around the periphery so as to make an angular rotation according to the weight of the object; a source of light facing the slitted portion of said disk; a pair of photoelectric conversion elements facing said light source with said slitted portion of the disk interposed therebetween, said a pair of photoelectric conversion elements being positioned in such a manner that when one photoelectric conversion element has its center disposed at the center of the disk slit, the other photoelectric conversion element has its center aligned with the side edge of the same disk slit or that of the adjacent disk slit; a pair of amplifiers for respectively amplifying electrical signals from the paired photoelectric conversion elements; first and second shaping means for shaping the wave forms of outputs from said paired amplifiers; and means for generating count up pulses for causing the UP-DOWN counter to count up according to outputs from the paired shaping means and count down pulses for causing said counter to count down according to said outputs.

4. A weighing apparatus according to claim 3 wherein the width of the individual slits formed in said disk and a space therebetween are equal to the light receiving surface of said photoelectric conversion elements.

5. A weighing apparatus according to claim 3 wherein said means for generating count up and count down pulses comprises a first differentiator; a series connection of a first inverter and a second differentiator, said first differentiator and said series connection being connected to said first shaping means; a second inverter connected to said second shaping means; and four AND gates, first AND gate being connected to said first differentiator and said second inverter, second AND gate being connected to said series connection and said second shaping means, third AND gate being connected to said first differentiator and said second shaping means, and fourth AND gate being connected to said series connection and said second inverter, thereby producing said count up pulses by combination of outputs of said first and second AND gates and said count down pulses by combination of outputs of said third and fourth AND gates.

6. A weighing apparatus according to claim 3 wherein said means for generating count up and count down pulses comprises a first differentiator connected to said first shaping means; a first inverter connected to said first shaping means; a second differentiator connected to said first inverter; a third differentiator connected to said second shaping means; a second inverter connected to said second shaping means; a fourth differentiator connected to said second inverter; and eight AND gates, first AND gate being connected to said first differentiator and said second inverter, second AND gate being connected to said second differentiator and said second inverter, third AND gate being connected to said second differentiator and said second shaping means, fourth AND gate being connected to said first differentiator and said second shaping means, fifth AND gate being connected to said third differentiator and said first shaping means, sixth AND gate being connected to said first shaping means and said fourth differentiator, seventh AND gate being connected to said first inverter and said fourth differentiator, and eighth AND gate being connected to said first inverter and said third differentiator, thereby producing said count up pulses by combination of outputs of said first, third, fifth and seventh AND gates, and said count down pulses by combination of outputs of said second, fourth, sixth and eighth AND gates.

7. A weighing apparatus according to claim 3 which further includes minute adjusting means for rotating the slitted disk to an extremely small extent so as to bring the center of one of said paired photoelectric conversion elements into alignment with the center of the disk slit; and an indicating means connected to one of said paired amplifiers so as to detect the relative positions of said one photoelectric conversion element and said disk slit.

8. A weighing apparatus according to claim 3 wherein said paired shaping means are Schmitt circuits at least one of which has hysteresis characteristics.

9. A weighing apparatus according to claim 1 wherein said UP-DOWN counter comprises means for detecting its zero content; and means, when actuated by output of said detecting means and count up pulse, for causing said UP-DOWN counter to count up by count up pulses and count down by count down pulses and when actuated by output from said detecting means and count down pulse, for causing said UP- DOWN counter to count up by count down pulses and count down by count up pulses.

10. A weighing apparatus according to claim 1 wherein, in case said unit price register has an N number of digits, said second counter generates a read-in instruction when its content is 0, a multiplication instruction when its content is 1, and a multiplication stop instruction when its content is N+1.

11. A weighing apparatus according to claim 1 wherein said signal generated according to the digital quantity is obtained by supplying said digital quantity to a timer circuit, thereby causing said second counter to be released from its reset condition in a certain length of time after extinguishment of said digital quantity.

12. A weighing apparatus according to claim 1 which further includes a memory key for preventing said signals generated according to said digital quantity from being conducted to said second counter, thereby enabling the second counter to maintain its predetermined content.

13. A weighing apparatus according to claim 1 which further includes means for detecting that the content of said UP-DOWN counter originates with error; and means for supplying reset pulses to said UP-DOWN counter in response to output of said detecting means so as to clear the content of said UP-DOWN counter.

14. A weighing apparatus according to claim 1 which further includes means for clearing the content of said unit price register and that of said UP-DOWN counter when the power source is actuated and for clearing the content of said UP-DOWN counter when the weight of a tare is deducted.

15. A weighing apparatus according to claim 1 which further includes means for detecting that the content of said UP-DOWN counter represents the weight of a tare; and means for clearing the content of said price register in response to output of said detecting means.

* * * * *